United States Patent
Acharya et al.

(10) Patent No.: US 6,477,534 B1
(45) Date of Patent: Nov. 5, 2002

(54) METHOD AND SYSTEM FOR GENERATING A STATISTICAL SUMMARY OF A DATABASE USING A JOIN SYNOPSIS

(75) Inventors: Swarup Acharya, New Providence; Phillip B. Gibbons, North Plainfield; Viswanath Poosala, Middlesex, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/480,261

(22) Filed: Jan. 11, 2000

Related U.S. Application Data

(63) Continuation-in-part of application No. 09/081,660, filed on May 20, 1998, now abandoned.
(60) Provisional application No. 60/125,244, filed on Mar. 19, 1999.
(51) Int. Cl.[7] .............................................. G06F 17/30
(52) U.S. Cl. ................................ 707/100; 707/3; 707/5
(58) Field of Search ............................ 707/2, 100, 102, 707/1, 3, 5

(56) References Cited

U.S. PATENT DOCUMENTS

| | | | | |
|---|---|---|---|---|
| 5,878,426 A | * | 3/1999 | Plasek et al. | 707/102 |
| 6,012,064 A | * | 1/2000 | Gibbons et al. | 707/103 |
| 6,108,647 A | * | 8/2000 | Poosala et al. | 707/1 |

OTHER PUBLICATIONS

Hellerstein, Joseph M., Peter J. Haas and Helen J. Wang, "Online Aggregation,A "A 1997, pp. 1–12.
Gibbons, Phillip B. and Yossi Matias, *New Sampling–Based Summary Statistics for Improving Approximate Query Answers*, Nov. 3, 1997, pp. 1–25.
IEEE Computer Society Technical Committee on Data Engineering, *"The New Jersey Data Reduction Report,"* Dec. 1997, vol. 20 No. 4, pp. 1–45.
IEEE Transactions on Knowledge and Data Engineering, *"Approximate–A Query Processor That Produces Monotonically Improving Approximate Answers,"* vol. 5, No. 6, Dec. 1993, pp. 1056–1068.
Olken, Frank, *"Random sampling From Databases,"* 1993, pp. 1–158.
Read, Robert L., Fussell Donald S., and Avi Silberschatz, *"A Multi–Resolution Relational Data Model,"* 1992, six(6) sheets.

* cited by examiner

*Primary Examiner*—Jean R. Homere
(74) *Attorney, Agent, or Firm*—Morgan & Finnegan, LLP

(57) ABSTRACT

A method for generating an approximate answer to a query in a database environment in which the database has a plurality of base relations. A query relating to a database is received, and an approximate answer to the query is generated such that the approximate answer is based on at least one join synopsis formed from the database. The method further includes steps of forming a sample-tuple set for at least one selected base relation of a plurality of base relations of a database such that each sample-tuple set contains at least one sample tuple from a corresponding base relation, and forming a join synopsis set for each selected base relation such that each join synopsis set contains a join synopsis for each sample tuple in a sample-tuple set. A join synopsis of a sample tuple is based on a join of the sample tuple and at least one descendent relation of the sample tuple. All join synopsis sets form a statistical summary of the database and are stored.

46 Claims, 7 Drawing Sheets

```
select avg(l_extendedprice) from customer, order, lineitem, supplier, nation, region
where c_custkey = o_custkey and o_orderkey = l_orderkey and l_suppkey = s_suppkey
and c_nationkey = s_nationkey = n_nationkey and n_regionkey = r_regionkey
and r_name = [region] and o_orderdate >= DATE [startdate] and o_orderdate < DATE [enddate]
```

FIG. 3

```
select avg(l_quantity) from lineitem, order
where l_orderkey = o_orderkey and o_orderstatus = F
```

```
select sum(l_quantity)
   from lineitem, order
   where l_orderkey = o_orderkey
   and o_orderstatus = F
```

FIG. 10B

```
select 100*sum(l_quantity)
   from LOsynopsis
   where o_orderstatus = F
```

FIG. 10C

```
select 100*sum(l_quantity), chunkid
   from LOsynopsis
   where o_orderstatus = F
   groupby chunkid
```

METHOD AND SYSTEM FOR GENERATING A STATISTICAL SUMMARY OF A DATABASE USING A JOIN SYNOPSIS

CROSS-REFERENCE TO RELATED APPLICATION

The present application is a continuation-in-part application of application Ser. No. 09/081,660, entitled System and Techniques For Fast Approximate Query Answering, filed May 20, 1998, and invented by S. Acharya et al., now abandoned and claims priority to provisional patent application 60/125,244, filed Mar. 19, 1999, both of which are incorporated by reference herein.

BACKGROUND OF THE INVENTION

1. Technical Field

The present invention relates to the field of database systems. More particularly, the present invention relates to a method for generating approximate answers in a large data warehousing environment in response to complex aggregate queries.

2. Description of the Related Art

Traditional query processing has focused solely on providing exact answers to queries in a manner seeking to minimize response time and maximize throughput. Providing an exact answer to a complex query in a large data recording and warehousing environment, however, can take minutes or even hours due to the amount of computation and disk I/O that may be required.

There are a number of scenarios in which a rapidly-obtained approximate answer is desired instead of an exact answer. For example, initial queries during a drill-down query sequence in ad-hoc data mining are used for determining interesting queries. See, for example, J. M. Hellerstein et al., Online aggregation, Proc. ACM SIGMOD International Conf. on Management of Data, pp. 171–182, May 1997, which is incorporated by reference herein. An approximate answer can provide feedback regarding how well a query is posed. An approximate answer can also provide a tentative answer to a query when the base data of a database is unavailable. An approximate answer can be used in a query requesting a numerical answer for which the full precision of the exact answer is not needed, e.g., a total, an average or a percentage for which only the first few digits of precision are of interest. Fast approximate answers can be used in a more traditional role within a query optimizer for estimating plan costs because a fast response time is required without an exact answer.

An approximate query answering system has two key requirements: (1) an accurate estimate of the exact answer, and (2) tight bounds on the confidence of the estimate. To illustrate the obstacles in achieving the requirements of an approximate query answering system, consider a set of uniform random samples of each base relation (referred to herein as base samples) in a database. Intuitively, such a set of base samples is a natural set of synopses (samples) for an approximate query engine. Both the accuracy of the estimate and the spread of confidence bounds strongly depend on the sample size used for generating the set of uniform random samples. Unless certain statistical properties can be guaranteed for the sample, the corresponding bounds are usually particularly pessimistic.

A necessary, but insufficient condition for the join of the base samples to be a uniform random sample of a join on base relations is for the probability for any two joined tuples to be in the join of the base samples to equal the probability for the (same) two tuples to be in a sample of the join on the base relations. Generally, though, the join of two uniform random base samples is not a uniform random sample of the join on the base relations. Consequently, a straightforward sampling approach can produce a poor quality estimation when aggregates on the tuples in multi-way joins are approximated based on a statistical guarantee of the multi-way join and the join output size. In most cases, the non-uniformity introduced by the join significantly degrades the accuracy of the answer and the confidence bounds. Moreover, the join of two uniform random samples typically has very few tuples, even when the join of the base relations has many tuples, thereby leading to both inaccurate answers and poor confidence bounds because the quality of the estimate critically depends on the number of tuples on which the estimate is based.

To show that a multi-way join can produce a poor quality approximation, consider a simple 2-way (equality) join of base samples of two relations R and S on an attribute X shown in FIG. 1. The letters a and b in FIG. 1 denote tuples with values a and b for an attribute X. Each segment (denoted as an edge herein) between an a-tuple or a b-tuple on the left-half of FIG. 1 (R.X) and the a-tuple or b-tuple in the right-half (S.X) depict a tuple that is in the join of R and S. Assume that the probability for each tuple to be in a base sample is $1/r$, for a given $r>1$. As shown in FIG. 1, edges a1 and a2 are in the join if and only if both a-tuples are selected from R and the one a-tuple is selected from S. Such a sample selection occurs with probability $1/r^3$ because three tuples must be selected.

On the other hand, edges a1 and b1 are in the join if and only if the four tuples incident to these particular edges are selected. Such a sample selection occurs with a probability of $1/r^4$ because four tuples must be selected. This contrasts with the fact that for a uniform random sample of the join of R and S, the probability that both edges a1 and a2 are selected equals the probability that both edges a1 and b1 are selected. Thus, generally, for any pair of relations joining on an attribute X, any X value that occurs in each relation and occurs more than once in at least one of the relations introduces a bias such that the join of the base samples is not a uniform random sample of the output of the join.

Now consider a second problem that is related to small output sizes. Consider two relations A and B, and base samples comprising 1% of each relation. The size of a foreign key join between relations A and B is equal to the size of relation A. The expected size of the join of the base samples is, however, 0.01% of the size of relation A because for each tuple in A, there is only one tuple in relation B that joins with it, and the probability that the particular tuple in B is in the sample for B is only 1%. Generally, for a k-way foreign key join and k base samples each comprising $1/r$ of the tuples in their respective base relations, the expected size of the join of the base samples is $1/r^k$ of the size of the actual join. The best known confidence interval bounds for approximate join aggregates based on base samples are quite pessimistic, as discussed by P. J. Haas, Large-sample and deterministic confidence intervals for online aggregation, Proc. 9th International Conf. on Scientific and Statistical Database Management, August 1997, and which is incorporated by reference herein. It is generally impossible to produce good quality approximate answers using samples on the base relations alone. Nevertheless, it is critical to overcome this problem because nearly all queries in a warehousing context involve complex queries have a large number of (foreign-key) joins.

Recently, there has been a flurry of work in approximate query answering. See, for example, S. V. Vrbsky et al., Approximate—a query processor that produces monotonically improving approximate answers, IEEE Trans. on Knowledge and Data Engineering, 5(6): 1056–1068, 1993; D. Barbará et al., The New Jersey data reduction report, Bulletin of the Technical Committee on Data Engineering, 20(4):3–45, 1997; P. B. Gibbons et al., Aqua project white paper, Technical report, Bell Laboratories, Murray Hill, N.J., December 1997; P. B. Gibbons et al., Fast incremental maintenance of approximate histograms, Proc. 23rd International Conf. on Very Large Data Bases, pp. 466–475, August 1997; J. M. Hellerstein et al., supra; and P. B. Gibbons et al., New sampling-based summary statistics for improving approximate query answers, Proc. ACM SIGMOD International Conf. on Management of Data, pp. 331–342, Jun. 1998, each of which is incorporated by reference herein. Only the work of Hellerstein et al., supra, has considered the problem of approximate join aggregates, which is an important problem because most non-trivial queries, especially for data warehousing schemas, involve joining two or more tables. For example, 13 of the 17 queries of the TPC-D benchmark involve queries on joins.

Statistical techniques for providing approximate query answering have been applied in databases for more than two decades, but primarily within the context of a query optimizer for selectivity estimation. See, for example, P. G. Selinger et al., Access path selection in a relational database management system, Proc. ACM SIGMOD International Conf. on Management of Data, pp. 23–34, June 1979, which is incorporated by reference herein. Nevertheless, application of statistical techniques to approximate query answering has started receiving attention only recently.

Regarding approximate query answering, Hellerstein et al., supra, disclose a framework for approximate answers of aggregation queries, referred to as online aggregation, in which base data is scanned in a random order at query time and an approximate answer is continuously updated as the scan proceeds. An option is provided for gradually obtaining the fully exact answer that is not affected by database updates. This approach is relatively costly because the original data is accessed at query time. Additionally, the problems with join queries as discussed by Hellerstein et al. apply to online aggregation. That is, a large fraction of the data must be processed before errors become tolerable. Other known systems support limited online aggregation features, such as the Red Brick system, which supports running COUNT, AVG, and SUM. Nevertheless, the resulting accuracy for the Red Brick system can be quite poor because the scan order used for producing the aggregations is not random.

There have been several recent works on "fast-first" query processing having a goal of quickly providing a few tuples of the exact query answer, but the focus has not been on obtaining statistically representative approximate answers. See, for example, R. J. Bayardo et al., Processing queries for first-few answers, Proc. 5th International Conf. on Information and Knowledge Management, pp. 45–52, November 1996; M. J. Carey et al., Reducing the braking distance of an SQL query engine, Proc. 24th International Conf. on Very Large Data Bases, pp. 158–169, August 1998; and G. Antoshenkov et al., Query processing and optimization in Oracle Rdb, VLDB Journal, 5(4):229–237, 1996, each of which is incorporated by reference herein.

In the APPROXIMATE query processor developed by S. V. Vrbsky et al., supra, an approximate answer to a set-valued query is any superset of the exact answer that is a subset of the Cartesian product. The query processor uses various class hierarchies for iteratively fetching blocks that are relevant to the answer, thereby producing tuples that are certain to be in the answer, while narrowing the possible classes that contain the answer. This work is quite different from a statistical approach, such as that taken by Hellerstein et al.

An approximate priority queue, for example, returns a fast, approximate min in response to an extract-min query. Approximate data structures for providing faster (approximate) answers to data structure queries, such as extract-min queries, are proposed and analyzed by Y. Matias et al., Dynamic generation of discrete random variables, Proc. 4th ACM-SIAM Symp. on Discrete Algorithms, pp. 361–370, January 1993; Y. Matias et al., Approximate data structures with applications, Proc. 5th ACM-SIAM Symp. on Discrete Algorithms, pp. 187–194, January 1994; and Y. Matias et al., Performance evaluation of approximate priorities queues, presented at DIMACS Fifth Implementation Challenge: Priority Queues, Dictionaries, and Point Sets, organized by D. S. Johnson et al., October 1996, each of which is incorporated by reference herein.

There has been a considerable amount of work developing statistical techniques for solving selectivity estimation and, more recently, for data reduction in large data warehouse environments. The three major classes of statistical techniques are sampling, histograms and parametric modeling techniques.

Regarding statistical sampling techniques, see, for example, W.-C. Hou et al., Statistical estimators for relational algebra expressions, Proc. 7th ACM Symp. on Principles of Database Systems, pp. 276–287, March 1988; R. J. Lipton, Practical selectivity estimation through adaptive sampling, Proc. ACM SIGMOD International Conf. on Management of Data, pp. 1–12, May 1990; P. J. Haas et al., On the relative cost of sampling for join selectivity estimation, Proc. 13th ACM Symp. on Principles of Database Systems, pp. 14–24, May 1994; R. J. Lipton et al., Query size estimation by adaptive sampling, J. Computer and System Sciences, 51(1):18–25, 1995; P. J. Haas et al., Sampling-based estimation of the number of distinct values of an attribute, Proc 21st International Conf. on Very Large Data Bases, pp. 311–322, September 1995; and S. Ganguly et al., Bifocal sampling for skew-resistant join size estimation, Proc. ACM SIGMOD International Conf. on Management of Data, pp. 271–281, June 1996, each of which is incorporated by reference herein.

For statistical techniques involving histograms, see, for example, P. R. Kooi, The Optimization of Queries in Relational Databases, Ph.D thesis, Case Western Reserve University, September 1980; V. Poosala et al., Improved histograms for selectivity estimation of range predicates, Proc. ACM SIGMOD International Conf. on Management of Data, pp. 294–305, June 1996; and V. Poosala, Histogram-based estimation techniques in databases, Ph.D thesis, University of Wisconsin-Madison, 1997, each of which is incorporated by reference herein.

Regarding statistical parametric modeling techniques, see, for example, C. M. Chen, Adaptive selectivity estimation using query feedback, Proc. ACM SIGMOD International Conf. on Management of Data, pp. 161–172, May. 1994, which is incorporated by reference herein.

A survey of various statistical techniques is provided by Barbaá et al., supra. A framework for studying synopsis data structures for massive data sets is provided by Gibbons et al., Synopsis data structures for massive data sets, DIMAS:

Series in Discrete Mathematics and Theoretical Computer Science, AMS., 1998, which is incorporated by reference herein. Two sampling-based synopses, concise samples and counting samples, which can be used for obtaining larger samples for the same space and for improving approximate query answers for hot list queries are disclosed by Gibbons et al., New sampling-based summary statistics for improving approximate query answers, Proc. ACM SIGMOD International Conf. on Management of Data, pp. 331–342, June 1998, and which is incorporated by reference herein.

Maintenance algorithms also exist for samples and histograms. For maintenance algorithms for samples, see, for example, F. Olken et al., Maintenance of materialized view of sampling queries, Proc. 8th IEEE International Conf. on Data Engineering, pp. 632–641, February 1992; and P. B. Gibbons et al., New sampling-based summary statistics for improved approximate query answers, Proc. ACM SIGMOD International Conf. on Management of Data, pp. 331–341, June 1998, each of which is incorporated by reference herein. For maintenance algorithms for samples and histograms, see, for example, P. B. Gibbons et al., Fast incremental maintenance of approximate histograms, Proc. 23rd International Conf on Very Large Data Bases, pp. 466–475, August 1997, and which is incorporated by reference herein. These maintenance techniques, however, are applicable only to statistics on base relations.

In view of the foregoing, what is needed is a technique that rapidly generates accurate approximate answers in a data warehouse environment in response to complex aggregate queries based on statistical summaries of the full data of a database. What is also needed is a technique for generating high-confidence error bounds for the approximate answers, and an efficient maintenance technique for maintaining the statistical summaries in the presence of updates to the database.

SUMMARY OF THE PRESENT INVENTION

The present invention provides a technique that rapidly generates accurate approximate answers in a data warehouse environment in response to complex aggregate queries based on statistical summaries of the full data of a database. The present invention also provides a technique for generating high-confidence error bounds for the approximate answers, and an efficient maintenance technique for maintaining the statistical summaries in the presence of updates to the database.

The advantages of the present invention are provided by a method for generating an approximate answer to a query in a database environment in which the database has a plurality of base relations. According to the invention, a query relating to a database, such as a complex and/or aggregate query, is received, and an approximate answer to the query is generated such that the approximate answer is based on at least one join synopsis formed from the database. The method of the present invention further includes steps of forming a sample-tuple set for at least one selected base relation of a plurality of base relations of a database such that each sample-tuple set contains at least one sample tuple from a corresponding base relation, and forming a join synopsis set for each selected base relation such that each join synopsis set contains at least one join synopsis for each sample tuple in a sample-tuple set. A join synopsis of a sample tuple is based on a join of the sample tuple and all descendent relations of the sample tuple. A relation R is a descendent of a relation S if there is a sequence of relations starting with R and ending with S such that there is a foreign key join possible between each consecutive pair in the sequence. All join synopsis sets form a statistical summary of the database and are stored.

The characteristics of a query workload can be assumed so that storage space is allocated among each respective synopsis by one of dividing an allotted storage space equally between join synopsis sets, dividing an allocated storage space between the join synopsis sets in proportion to a cube root of a join synopsis tuple size of each respective join synopsis set, and dividing an allocated storage space between the join synopsis sets in proportion to a join synopsis tuple size of each respective join synopsis set.

A way for reducing the amount of storage space needed is by eliminating redundant columns of each join synopsis, and storing only selected columns of each join synopsis. Further, the tuples of each join synopsis set can be renormalized into constituent relations of the join synopsis sets, and duplicative tuples with each constituent relation can be removed.

The method of the present invention also provides the steps of determining a fraction of queries in a query set for which each relation of the plurality of base relations of the database is one of a source relation in a join or a sole relation in a query without joins, and dividing an allotted storage space among join synopsis sets to minimize an average relative error over the queries based on a high-level characterization of the query set. A relation is a source relation in a join if it is not a descendant relation of any other relation in the query.

A confidence bound can be generated for the approximate answer that is based on one of a Hoeffding bound, a Chebychev (conservative) bound, a Chebychev (estimated σ) bound and a Central Limit Theorem bound. Alternatively, the confidence bound can be generated by partitioning the join synopsis sets into a predetermined number of subsets, and generating an estimator for each subset. Preferably, the subsets are the same size. In one aspect of the present invention, an average of the estimators for the subsets is determined, and the confidence bound is generated based on the average of the estimators. In another aspect of the present invention, a median of the estimators for the subsets is determined, and the confidence bound is generated based on the median of the estimators.

The present invention also includes steps of adding a new tuple to the sample-tuple set for a selected base relation with a probability p when the new tuple is inserted into the selected base relation, such that probability p is related to a ratio of a number of tuples in the sample-tuple set to a number of tuples in the selected base relation, and forming a join synopsis corresponding to the new tuple when the new tuple is added to the sample-tuple set for the selected base relation, such that the join synopsis for the new tuple being based on a foreign key join of the new tuple and all descendent relations of the new tuple. When a target size for the sample-tuple set is exceeded, a tuple of the sample-tuple set is uniformly selected at random for the selected base relation. The selected tuple is removed from the sample-tuple set for a selected base relation and the join synopsis corresponding to the removed tuple is removed. A tuple is removed from the sample-tuple set for a sample base relation when the tuple is removed from the selected base relation and is contained in the sample-tuple set for the selected base relation. Additionally, the join synopsis corresponding to the removed tuple is removed. When a target minimum size for a sample tuple is equaled, the sample-tuple set is repopulated by rescanning the selected base relation, and a join synopsis is formed for each tuple selected by rescanning the selected base relation.

BRIEF DESCRIPTION OF THE DRAWINGS

The present invention is illustrated by way of example and not limitation in the accompanying figures in which like reference numerals indicate similar elements, and in which:

FIG. 3 shows the SQL statement for a query $Q_a$ used in test runs on the data of the TPC-D benchmark;

FIG. 7 shows the SQL statement for a query $Q_m$ used in test runs for studying join synopsis maintenance;

FIGS. 10(a)–10(c) show a query rewritten according to the present invention to use join synopsis set.

DETAILED DESCRIPTION

Figure 1:
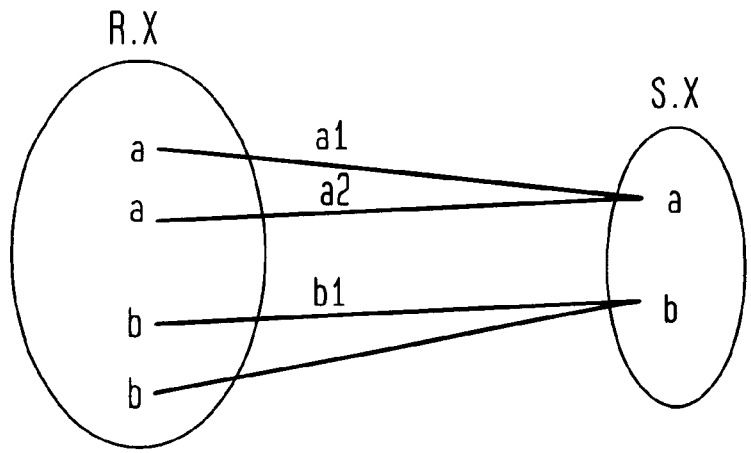
FIG. 1 depicts an exemplary equality join of samples of two relations R and S on an attribute X for illustrating the difficulty in producing high quality approximations for aggregate queries with joins.

Conventional techniques for generating approximate answers to aggregate queries on joins of database relations based solely on random samples of base relations suffer from serious disadvantages, both theoretically and empirically, as described above. The present invention overcomes such disadvantages and in so doing rapidly generates accurate approximate answers to aggregate queries on joins of relations based on statistical summaries of the full data in a data warehousing environment. The phrase "approximate answers to aggregate queries on joins of relations," as used herein, will be abbreviated as "approximate join aggregates." An approximate response generated by the present invention is based on a technique that minimizes the number of accesses, or all together avoids accesses, to the base data, thereby providing an approximate result in a time that is orders of magnitude less than the time required for computing an exact answer.

The present invention uses precomputed samples of a plurality of distinguished joins (referred to herein as join synopsis sets) for computing approximate join aggregates. Precomputing just one join synopsis set for each relation suffices to significantly improve the quality of approximate answers for arbitrary queries having foreign key joins. For database schemas having only foreign key joins, such as used in data warehousing environments, the present invention provides good quality approximate join aggregates using a small number of join synopsis sets. For a given amount of storage space, approximate query techniques based on join synopsis sets provide better results than approximate query techniques that are based on solely samples of base relations.

An important issue arising out of the use of several sets of statistical summaries is careful allocation of a limited amount of storage space among the different sets. The present invention provides schemes for advantageously allocating available storage space among the join synopsis sets based on an assumed query workload, thereby minimizing the overall error of approximate answers. Any of several heuristics can be used for allocating space between different statistical sets. Another important issue associated with approximate join aggregates is that of providing confidence bounds for approximate answers because such bounds provide valuable feedback regarding the reliability of an answer. In this regard, the present invention provides an empirical technique for computing confidence bounds based on extracting subsamples from samples. Additionally, the present invention provides an efficient maintenance algorithm having minimal overhead so that join synopsis sets can be incrementally maintained in the presence of updates to the base relations.

A natural way to precompute samples of join results is to execute all possible join queries of interest and collect samples of the resulting join queries. Such an approach, however, is not particularly feasible because it is simply too expensive to compute and maintain in terms of time and required storage space. In contrast, the present invention computes samples of the results of a small set of distinguished joins in a schema, thereby obtaining random samples of all possible joins in the schema. Accordingly, the technique of the present invention is applicable to star and snowflake schemas, such as acyclic schemas having only foreign key joins that are typically found in data warehousing environments. See, for example, D. Schneider, The ins & outs (and everything in between) of data warehousing, Tutorial in the 23rd International Conf. on Very Large Data Bases, August 1997, which is incorporated by reference herein.

According to the present invention, a database schema is modeled by a graph having nodes corresponding to relations and having edges corresponding to every possible 2-way foreign key join for the schema. As used herein, a 2-way join $r_1 \bowtie r_2$, $r_1 \neq r_2$, is a foreign key join if the join attribute is a foreign key in $r_1$ (i.e., a key in $r_2$). For $k \geq 3$, a k-way join is a k-way foreign key join if there is an ordering $r_1, r_2, \ldots, r_k$ of the relations being joined that satisfies the property that for $i=2, 3, \ldots, k$, $S_{i-1} \bowtie r_i$ is a 2-way foreign key join, where $S_{i-1}$ is the relation obtained by joining $r_1, r2, \ldots, r_{i-1}$. There is a one-to-one correspondence between a tuple in a relation r, and a tuple in the output of any foreign key join involving r and the relations corresponding to one or more of its descendants in the graph. That is, a sample $S_r$ of a relation r is used for producing another relation $J(S_r)$ that, in turn, is used for providing random samples of any join involving r and one or more of its descendants. A relation $J(S_r)$ will be referred to herein as a join synopsis set of a relation r.

Figure 2:
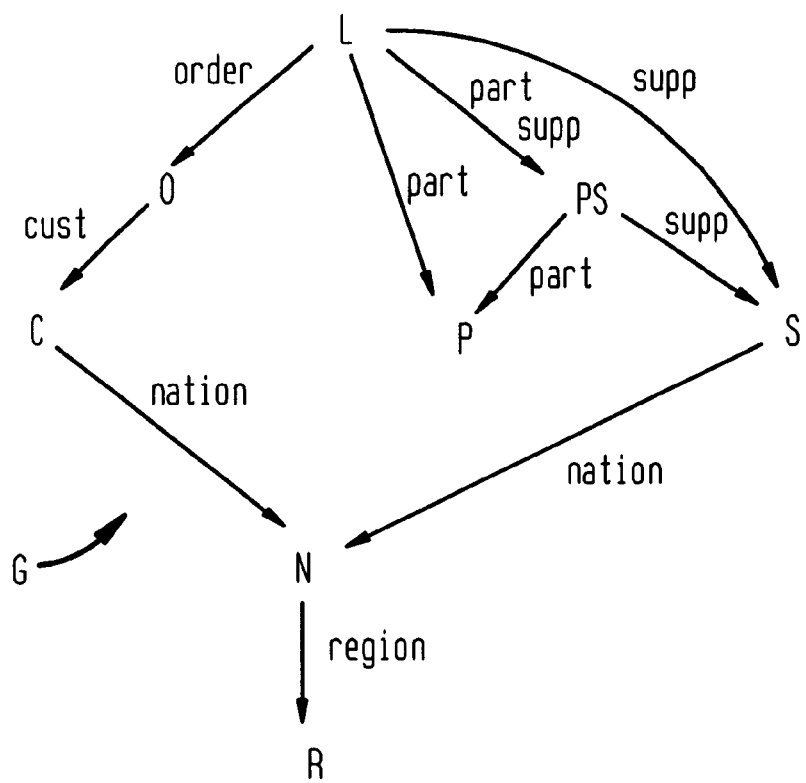
FIG. 2 shows an exemplary directed acyclic graph G for the TPC-D benchmark.

Consider a directed acyclic graph G having a vertex for each base relation and a directed edge from a vertex u to a vertex $v \neq u$ if there are one or more attributes in relation u that constitute a foreign key for relation v. FIG. 2 shows an exemplary directed acyclic graph for the TPC-D benchmark. Each edge is labeled with the foreign key. Two key lemmas about the properties of G follow:

Lemma 1: The subgraph of G on the k nodes in any k-way foreign key join must be a connected subgraph with a single root node.

Proof: The proof is by induction using a base case of a single node $r_1$. Consider an ordering $r_1, \ldots, r_k$ on the relations that satisfies the k-way foreign key join property given above. Let $1<i\leq k$ and $s_{i-1}=r_1 \bowtie \ldots \bowtie r_{i-1}$. Assume that the subgraph $G_{i-1}$ on the i-1 nodes in $s_{i-1}$ is connected with a single root node $r_1$. Because $s_{i-1} \bowtie r_i$ is a 2-way foreign key join, the join attribute must be a key in $r_i$. Thus, there is an edge directed from some node in $G_{i-1}$ to $r_i$, implying that $G_{i-1}=G_{i-1} \cup r_i$ is a connected subgraph of G. Hence, there is a directed path in G from $r_1$ to $r_i$. Because G is acyclic, $r_i \neq r_1$, so $r_i$, which by the inductive assumption is the only root node in $G_{i-1}i$, is the only root node of $G_i$. Lemma 1 follows by induction.

An important concept of the present invention is that of a source relation for a k-way foreign join key. The relation corresponding to the root node will be denoted herein as the source relation for the k-way foreign key join.

Lemma 2: There is a one-to-one correspondence between tuples in a relation $r_1$ and tuples in any k-way foreign key join with source relation $r_1$.

Proof: By the definition of a join, for each tuple $\tau$ in the output of a join, there exists a tuple $\tau'$ in $r_1$ such that $\tau$ projected on the attributes in $r_1$ is $\tau'$. Conversely, for each tuple $\tau'$ in $r_1$, there is exactly one tuple $\tau$ in the k-way foreign key join. To show this inductively, consider an ordering $r_1, \ldots, r_k$, on the relations that satisfies the k-way foreign key join property given above in Lemma 1. The claim trivially holds for the base case of a single relation $r_1$. Let $1<i\leq k$ and $s_{i-1}=r_1 \bowtie \ldots \bowtie r_{i-1}$. Assume inductively that for each tuple $\tau$ in $r_1$, there is exactly one tuple $\tau$ in $s_{i-1}$. Because $s_{i-1} \bowtie r_i$ is a 2-way foreign key join, the join attribute must be a key in $r_i$. Thus, there is at most one tuple in $r_i$ joining with each tuple in $s_{i-1}$. Furthermore, due to foreign key integrity constraints, there is at least one such tuple. Hence, for each tuple $\tau'$ in $r_1$, there is exactly one tuple $\tau$ in $s_i=s_{i-1} \bowtie r_i$. The assertion and Lemma 2 follow by induction.

From Lemma 1, each node can be the source relation only for k-way foreign key joins involving its descendants in G. For each relation r, there is a maximum foreign key join (i.e., having the largest number of relations) with r as the source relation. For example, in FIG. 2, the maximum foreign key join for a source relation C is C $\bowtie$ N $\bowtie$ R. Similarly, the maximum foreign key join for a source relation L is L $\bowtie$ O $\bowtie$ C $\bowtie$ N1 $\bowtie$ R1 $\bowtie$ PS $\bowtie$ P $\bowtie$ S $\bowtie$ N2 $\bowtie$ R2.

A join synopsis according to the present invention is now formally defined. For each node u in graph G corresponding to a relation $r_1$, a maximal join result J(u) is defined to be the output of the maximum foreign key join $r_1 \bowtie r_2 \bowtie \ldots \bowtie r_k$ with source $r_1$. Accordingly, if u has no descendants in G, then k=1 and J(u)=$r_1$. For a sample tuple $\tau$ of $r_1$, a join synopsis is defined to be the output of $\tau \bowtie r_2 \bowtie \ldots \bowtie r_k$. For a uniform random sample $S_u$ of $r_1$, a join synopsis set $J(S_u)$ is defined to be the output of $S_u \bowtie r_2 \bowtie \ldots \bowtie r_k$. Thus, the join synopses sets of a schema consist of $J(S_u)$ for all u in G. For example, in the TPC-D schema shown in FIG. 2, the join synopsis set for relation R is simply a sample of R, whereas the join synopsis set for relation C is the join of relation N, relation R and a sample of C. (To emphasize the sampling nature of join synopsis sets, join synopsis sets will be sometimes referred to herein as join samples.)

As used herein, a sample-tuple set of a relation r includes at least one sample tuple from relation r. Also as used herein, a join synopsis set of a relation r includes a join synopsis for each sample tuple in a sample-tuple set of relation r, such that each respective join synopsis is based on a join of the corresponding sample tuple and at least one descendent relation of the sample tuple.

The join synopsis set of a relation is used to obtain a uniform random sample for a large set of queries. This leads to Theorem 1.

Theorem 1: Let $r_1 \bowtie \ldots \bowtie r_k$ for $k \geq 2$ be an arbitrary k-way foreign key join for a source relation $r_1$. Let u be a node in G corresponding to $r_1$. Let A be a set of attributes in $r_i, \ldots, r_k$. Then, the following statements are true:
(1) $J(S_u)$ is a uniform random sample of J(u), with $|S_u|$ tuples (from Lemma 2);
(2) $r_1 \bowtie \ldots \bowtie r_4=\pi_A J(u)$, i.e., the projection of J(u) on the attributes in $r_1, \ldots, r_k$, which is trivially true based on the definition of a maximal join result J(u); and
(3) $\pi_A J(Su)$ is a uniform random sample of $r_1 \bowtie \ldots \bowtie r_k$ ($=\pi_A J(u)$), with $|S|$ tuples, which follows from statements (1) and (2) of Theorem 1.

Thus, a uniform random sample of the output of any k-way foreign key join for $k \geq 2$ can be extracted from a join synopsis set. For example, the join synopsis set of L in the TPC-D schema in FIG. 2 can be used for obtaining a sample of any foreign key join involving L.

Lemma 3, below, establishes that a single join synopsis can be used for a large number of distinct joins, particularly for star-like schemas, which are common in data warehouses. Two joins are distinct if the joins do not join the same set of relations.

Lemma 3: A uniform random sample of the output of between k-1 and $2^{k-1}-1$ distinct foreign key joins can be extracted from a single join synopsis set for a node having a maximum foreign key join with k relations.

Proof: A uniform random sample of the output of k-1 distinct foreign key joins can be extracted when all the descendants of the node form a line in a graph G. A uniform random sample of the output of $2^{k-1}-1$ distinct foreign key joins can be extracted when the node is the root of a star of all its descendants, as in a star schema.

Lemma 2 fails to apply generally for any relation other than the source relation, so joining tuples of any relation r other than the source relation will not, in general, be a uniform random sample of r. Thus, distinct join synopsis sets are needed for each node/relation for obtaining a uniform random sample of each node/relation.

Because tuples in a join synopsis set are the results of multi-way joins, a potential problem is that join synopsis tuples will be too large by having many columns. To reduce the number of columns stored, redundant columns can be eliminated (for example, join columns) and/or only columns of interest are stored. Small relations can be stored in their entirety, rather than as part of a join synopsis set. To further reduce the space required for storing join synopsis sets, the tuples in a join synopsis set can be renormalized into the constituent relations of the join synopsis set and duplicate tuples within each constituent relation can be removed. To the extent that foreign keys are many-to-one, renormalization reduces the space required for storage even though the key will then be replicated. Of course with renormalization, when a tuple in $S_u$ is deleted, any joining tuples in the constituent relations must be deleted as well. This can be done either immediately or in a lazy fashion in a batch. The following lemma, which is stated without proof, establishes a bound on the size of a renormalized join synopsis set.

Lemma 4: For any node u having a maximum foreign key join that is a k-way join, the number of tuples in its renormalized join synopsis set $J(S_u)$ is at most $k|S_u|$.

As an example, consider the TPC-D schema shown in FIG. 2. In the TPC-D benchmark database, the relations N and R, corresponding to Nation and Region, respectively contain 25 and 5 tuples. Therefore, the N and R relations can be stored in their entirety without considering any samples and, consequently, can be removed from the graph of FIG. 2, leaving nodes L, PS, O, C, P, and S.

Two simplifying assumptions are now made: (1) the tuple size in each base relation is the same; and (2) the number of tuples n allocated to each join synopsis set is the same. By Lemma 4, the total number of tuples in the synopsis sets for the TPC-D schema shown in FIG. 2 is at most $|N|+|R|+\Sigma_u k_u|S_u|=14n+30$. For every possible join in the TPC-D schema, a uniform random sample of 1% of each join result can be obtained from a collection of join synopsis sets that in total uses less than 15% of the storage space needed for the original database. The size of the join synopsis sets can be further reduced by taking advantage of the fact that frequently foreign keys are many-to-one. Thus, it is possible to create compact join synopsis sets of a schema having foreign key joins such that a random sample of any join in the schema can be obtained.

The present invention also provides advantageous schemes for allocating available memory space among various join synopsis sets when certain properties of the query workload are known, and heuristics for the general case when such properties are not known. To illustrate advantageous schemes for allocating available memory space among various join synopsis sets, consider a high-level characterization of a set of queries S having selects, aggregates, group-bys and foreign key joins. For each relation $R_i$, the fraction $f_i$ of the queries in query set S for which relation $R_i$ is either the source relation in a foreign key join or the sole relation in a query without joins is first determined. As an example, for the 17 queries in the TPC-D benchmark, relation L is the source or sole relation for 14 queries and relation PS is the source or sole relation for 3 queries. Hence, the fraction $f_i$ equals 14/17 for relation L and equals 3/17 for relation PS. For all other relations, $f_i$ equals zero.

Join synopsis sets (join samples) sizes are then selected for minimizing the average relative error over a collection of aggregate queries based on the high-level characterization of query set S. This is done analytically by minimizing the average relative error bounds (i.e., confidence intervals) over query set S. Although this seems to imply that the optimal size allocation is specific to the type of error bounds used, a large class of error bounds share a common property that is used by the present invention for optimal size allocation. Specifically, the error bounds for optimal size allocation according to the present invention and for COUNT, SUM, and AVG based on the commonly-used Hoeffding bounds, Chebychev bounds and Central Limit Theorem bounds, share the property that the error bounds are inversely proportional to $$\sqrt{n}, \quad (1)$$

where n is the number of tuples in the (join) sample.

Thus, the average relative error bound over the queries is proportional to $$\sum_i \frac{f_i}{\sqrt{n_i}}, \quad (2)$$

where $n_i$ is the number of tuples allocated to the join sample for a source relation $R_i$ and $f_i$ is the fraction of the queries in the set of queries S for which $R_i$ is either the source relation in a foreign key join or the sole relation in a query without joins.

The goal is to select an $n_i$ to minimize Eq. (2) for a given bound N on the total storage space allotted for join synopsis sets. For each source relation $R_i$, let $s_i$ be an amount of space needed to store a join synopsis for $R_i$. The amount $s_i$ is referred to herein as the join synopsis tuple size for $R_i$. Thus, $\Sigma_i n_i s_i \leq N$ must be satisfied. For optimal allocation, $n_i$ is selected to be proportional to $(f_i/s_i)^{2/3}$. This leads to Theorem 2.

Theorem 2: Given N, $f_i$ and $s_i$ for all relations $R_i$, $$n_i = N' \cdot \left(\frac{f_i}{s_i}\right)^{2/3}, \quad (3)$$

where $N'=N/(\Sigma_j f_j^{2/3} s_j^{1/3})$, minimizes Eq. (2) subject to the constraint that $\Sigma_i n_i s_i \geq N$.

Proof: Because additional sample points only decrease Eq. (2), the optimal solution is $\Sigma_i n_i s_i = N$. Assume first that $s_i=1$ for all i, and let r be the number of source relations. Consider the optimal choice of $n_i$'s that minimizes Eq. (2). Consider any pair j, k, each at most r, j≠k. If $n_j=x$ and $C=N-n_i$ so that $n_k=C-x$, then minimizing for x, the expression $$\frac{f_j}{\sqrt{x}} + \frac{f_k}{\sqrt{C-x}} \quad (4)$$

results in the optimal solution. To find the value of x minimizing the expression of Eq. (4), the derivative of Eq. (4) is set to zero. That is, $$\frac{1}{2} f_j x^{-3/2} + \frac{1}{2} f_k (C-x)^{-3/2} = 0. \quad (5)$$

Substituting $n_j=x$ and $n_k=C-x$ into Eq. (5) results in $$\frac{n_j}{n_k} = \left(\frac{f_j}{f_k}\right)^{2/3}. \quad (6)$$

Because this holds for every pair j≠k and $\Sigma_i n_i=N$, it follows that $$n_i = N \frac{f_i^{2/3}}{\sum_j f_j^{2/3}}. \quad (7)$$

Now consider the general case where the join synopsis tuple sizes may be distinct and greater than one. Let $n'_i = n_i s_i$ and $$f'_i = f_i \sqrt{s_i}. \quad (8)$$

Then, the expression for Eq. (4) can be rewritten to minimize $$\sum_i \frac{f'_i}{\sqrt{n'_i}}, \quad (9)$$

where $$\Sigma_i n'_i = N. \quad (10)$$

Using the solution derived above, the expression for Eq. (4) is minimized for $$n'_i = N \frac{f_i^{2/3}}{\Sigma_j f_j^{2/3}} = N \frac{f_i^{2/3} s_i^{1/3}}{\Sigma_j f_j^{2/3} s_j^{1/3}}. \quad (11)$$

Therefore, $$n_i = n'_i / s_i = N \frac{(f_i/s_i)^{2/3}}{\sum_j f_j^{2/3} s_j^{1/3}}. \quad (12)$$

The analysis of optimum allocation of available storage space has thus far ignored predicate selectivities. The relative error bounds for the technique of the present invention and for COUNT, SUM, and AVG based on the commonly-used Hoeffding bounds and Chebychev bounds are either proportional to $$1/\sqrt{qn} \quad (13)$$

or $$1/q\sqrt{n}, \quad (14)$$

where q is the selectivity (i.e., $0 \leq q \leq 1$ is the fraction of tuples satisfying the query predicate). In the absence of a characterization of the query workload in terms of predicate selectivities, it is assumed that the selectivities are independent of the relations. Incorporating a selectivity characterization can readily be done, although the analysis is more detailed. Under the assumption that the selectivities are independent of the relations, the above analysis is good for any combination of selectivities.

Lastly, sample sizes can be adapted to a changing query load by maintaining the frequencies $f_i$ and reallocating among the join samples as the query frequencies change.

In the absence of query workload information, three schemes can be used as starting points for allocating available storage space among the various join synopsis sets: EqJoin, CubeJoin and PropJoin. The EqJoin allocation scheme divides up allotted storage space N equally among the relations, and each respective relation devotes all its allocated space to join synopsis sets. For relations having no descendants in the schema, this equates to a sample of the base relation. The CubeJoin allocation scheme divides up the allotted storage space N among the relations in proportion to the cube root of their respective join synopsis tuple sizes. Each respective relation devotes all its allocated space to join synopsis sets. The PropJoin allocation scheme divides up the allotted storage space N among the relations in proportion to their respective join synopsis tuple sizes, and each respective relation devotes all its allocated space to join synopsis sets. Thus, each join synopsis for the PropJoin allocation scheme has the same number of tuples.

For the EqJoin, CubeJoin and PropJoin allocation schemes, the number of tuples for a join synopsis set having a tuple size $s_i$ is respectively inversely proportional to $s_i$, $s_i^{2/3}$ and 1. When the error bounds are inversely proportional to $$\sqrt{n}, \quad (14)$$

CubeJoin minimizes the average relative error bounds when all fractions $f_i$ are assumed to be equal (Theorem 2), and PropJoin minimizes the maximum error bound when all fractions $f_i$ are nonzero.

The EqJoin, CubeJoin and PropJoin allocation schemes, which are based on join samples, are respectively analogous to the EqBase, CubeBase and PropBase allocation schemes, which are based on only base samples. EqBase is similar to EqJoin to the extent that EqBase divides up allotted storage space N equally among the relations and each respective relation devotes all its allocated space to base samples. CubeBase is similar to CubeJoin to the extent that CubeBase divides up the allotted storage space N among the relations in proportion to the cube root of their respective sample tuple sizes, and each respective relation devotes all its allocated space to base samples. PropBase is similar PropJoin to the extent that PropBase divides up the allotted storage space N among the relations in proportion to their respective base sample tuple sizes, and each respective relation devotes all its allocated space N to base samples.

The trade-offs associated with the error bounds obtained for approximate answers for various conventional techniques and the advantages of a subsampling method of the present invention (which is also referred to herein as chunking) in certain scenarios is now considered. Both traditional error bounds (e.g., confidence intervals based on Hoeffding bounds) and empirical bounds arising from chunking are considered. As will be shown, chunking can noticeably improve the confidence bounds.

An important advantage of using join synopsis sets according to the present invention is that queries having foreign key joins can be treated as queries without joins, that is, single-table queries. Known confidence bounds for single-table queries are much faster to compute and much smaller than the confidence bounds for multi-table queries. See, for example, P. J. Haas, Hoeffding inequalities for join-selectivity estimation and online aggregation, Technical Report RJ 10040, IBM Almaden Research Center, San Jose, Calif., 1996, which is incorporated by reference herein. Smaller confidence bounds are advantageous because they assert that the exact answer lies in a smaller interval around the approximate answer. Table 1 below lists several popular techniques for obtaining error bounds for approximate answers (single-table) aggregate queries. For queries having joins in which at least one join is not foreign key, the (much weaker) multi-table formulas disclosed by P. J. Haas, supra, can be applied to the join synopsis sets representing the joins that are foreign key.

For simplicity, only single-table queries and only the results for queries having no predicates are considered in the following discussion.

Turning first to traditional error bounds, consider a data set having m items where m is known. Let $x_1, \ldots, x_m \in$ [MIN, MAX] be the results of applying any arithmetic expression to the items in the data set. Let $v_1, \ldots, v_n$ be a uniform random sample of the multiset $\{X_1, \ldots, X_m\}$. An estimate of the aggregate (AVG, SUM, and COUNT) on all m values based on the uniform random sample of n values is desired. Table 1 summarizes traditional estimates and bounds for AVG, SUM and COUNT having no predicates, where p is the desired confidence probability.

TABLE 1

| Aggregate | Estimate e | Method | Bound on t | Guarantee |
|---|---|---|---|---|
| AVG | | CLT | $z_p \hat{\sigma}/\sqrt{n}$ | no |
| | $\frac{1}{n}\sum_{i=1}^{n} v_1$ | Hoeffding | $(\max - \min)\sqrt{\frac{1}{2n}\ln\frac{2}{1-p}}$ | yes |
| | | Chebychev (known $\sigma$) | $\frac{\sigma}{\sqrt{n(1-p)}}$ | yes |
| | | Chebychev (estimated $\sigma$) | $\frac{\hat{\sigma}}{\sqrt{n(1-p)}}$ | no |
| | | Chebychev (conservative) | $\frac{MAX - MIN}{2\sqrt{n(1-p)}}$ | yes |
| SUM | $\frac{m}{n}\sum_{i=1}^{n} v_1$ | same AVG, but the bound is multiplied by m | | |
| COUNT | m | trivial | 0 | yes |

Upper bounds for the error bound t are shown in Table 1 such that $\Pr(|e-\mu| \leq t) \geq p$, where $\mu$ is the precise result to an aggregate, and e is an estimate based on n samples. The bounds are expressed in terms of $\sigma$, which is the standard deviation of the $x_i$, and $\hat{\sigma}$, which is the square root of the sample variance computed from the $v_1, \ldots, v_n$ comprising the uniform random sample. For the CLT bound, which is derived from the Central Limit Theorem (denoted as the large sample bound in J. M. Hellerstein et al., supra), $z_p$ is the quantile of the normal distribution such that for a standard normal random variable X, $\Pr(X \in [-z_p, z_p]) = p$, e.g., $z_{0.95} = 1.96$ and $z_{0.9} = 1.65$.

Three versions of the Chebychev bound are shown in Table 1: one where $\sigma$ is known, one where $\sigma$ is replaced by $\hat{\sigma}$ (similar to the CLT bound), and one where a is replaced by its upper bound (similar to the Hoeffding bound). The last column of Table 1 indicates whether a bound is guaranteed with probability p or holds with probability p only under large sample assumptions, as discussed in J. M. Hellerstein et al., supra and P. J. Haas, supra.

Based on Table 1, of the two bounds using $\hat{\sigma}$, the Chebychev (estimated $\sigma$) bound is greater than the CLT bound for all p of interest, e.g., $p \geq 0.67$. Comparing the guaranteed bounds, the Chebychev bounds are smaller for $p < 0.76$, even when the Chebychev (conservative) bound is used. When no smaller bound is known for $\sigma$ than the Chebychev conservative bound to ((MAX−MIN)/2), then the Hoeffding bound is smaller for $p > 0.76$. When $\sigma$ is known then for $$p_1 \approx 1 - \frac{\sigma^2}{(MAX-MIN)^2 \ln \frac{MAX-MIN}{\sigma}}, \quad (16)$$

the Chebychev (known a) bound is smaller for $p < p_i$, and the Hoeffding bound is smaller for $p > p_1$.

To show the accuracy of the subsampling, or chunking, technique of the present invention, consider a set of sample points that are partitioned into k subsets (subsamples), each of which are referred to herein as "chunks". For each chunk j, an estimator $e_j$ is computed based on the sample points in chunk j. An estimate and a bound are then determined and reported based on estimators $e_1, \ldots, e_k$.

Given a procedure yielding a single random estimator, an overall estimate can often be obtained having small error bounds and high confidence by repeating the procedure. See, for example, N. Alon et al., The space complexity of approximating the frequency moments, Proc. 28th ACM Symp. on the Theory of Computing, pp. 20–29, May 1996, which is incorporated by reference herein.

According to Alon et al., when a set of independent estimators is generated, the set is partitioned into subsets, and the average within each subset is determined. The median of the averages is then determined. The final error bounds are obtained by using Chebychev bounds for analyzing the subset estimators and by using Chernoff bounds for analyzing the extent to which taking the median boosts the confidence. In the context of the present invention, each sample point $v_i$ is a random estimator, each subset is a chunk, and the overall estimate is the average or the median. The number of sample points is fixed and the best estimate using the sample at hand is desired.

Any of the error bound techniques shown in Table 1 can be applied for obtaining chunk estimators $e_j$ and the confidence bounds for the estimators. Because each chunk estimator is based on only a subsample, the confidence in a single chunk estimator is less than if the confidence were based on the entire sample. Because the subsamples do not overlap, however, each chunk estimator is an independent random estimator, and an overall estimate based on all the $e_j$ potentially results in a better estimate and smaller error bounds. Two possible choices for determining an overall estimate e are considered: (1) determining the average of the $e_j$ estimators, and (2) determining the median of the $e_j$ estimators.

Within the general chunking framework of the present invention, a number of alternative procedures for determining an estimate and an error bound based on the chunks, including varying the number of chunks, are now considered. Whereas previous work regarding the median has been asymptotic in nature, to show the precise trade-offs for when the guaranteed bounds for the median improve upon the bounds when no chunking is performed, and the optimal number of chunks that should be used for confidence probabilities of practical interest, the actual bounds are applied in Eq. (18) below instead of the asymptotic Chernoff bounds.

For desired confidence probabilities of greater than 96%, the best bounds are obtained by determining the median of a small number of chunks and applying Chebychev bounds. The advantages of chunking, however, are not obtained when either the Hoeffding bound is used or when the Chebychev (conservative) bound is less than the Hoeffding bound.

To consider the trade-offs with guaranteed bounds when chunking is performed, consider a data set having m items where m is known. Let $x_1, \ldots, x_m \in$ [MIN, MAX] be the results of applying any arithmetic expression to the items in the data set. Let $v_1, \ldots, v_n$ be a uniform random sample of the multiset $\{x_1, \ldots, X_m\}$. The n sample points are partitioned into k equal-sized chunks. Let $e_j$ be the estimator for chunk j. For the AVG aggregate, for example, $e_j$ is the sum of the sample points $v_i$ in chunk j divided by n/k, the number of sample points in chunk j.

The two step estimation approach previously described is applied. While the desired confidence for the overall estimate is p, the confidence for a single chunk estimator can be less than p because the confidence can be increased by determining the median. For any confidence $\rho$ such that $\frac{1}{2} < \rho \geq p$, any of the approaches in Table 1 can be used for determining an error bound $t_j$ for each chunk estimator $e_j$. Let t be the maximum of the $t_j$, so that for each $e_j$, $$Pr(|e_j - \mu| < t) \geq \rho. \quad (17)$$

The second step is now applied by taking the median $e^*$ of the $e_j$ estimators. When k is even, either of the two medians is taken. To reduce the bias, either median is selected with equal probability. The goal is to have $Pr(|e^* - \mu| < t) \geq p$.

An estimate e is considered "good" when $|e - \mu| < t$. Otherwise, the estimate is "bad". Because $e^*$ is the median of the $e_j$ estimators, $e^*$ will be good if and only if at least half of the $e_j$ estimators are good. By Eq. (17), each estimator $e_j$ is good with a probability of at least $\rho > \frac{1}{2}$. Let k' be the number of estimators $e_j$ that are good, and let $$q_k = \sum_{i=0}^{\lfloor \frac{k}{2} \rfloor} \binom{k}{i} \rho^i (1-\rho)^{k-i} \quad (18)$$

Then, the probability that median $e^*$ is bad is $$Pr\left(k' \leq \left\lfloor \frac{k}{2} \right\rfloor\right) \leq q_k. \quad (19)$$

So, the goal is attained when $qk = 1 - p$.

Each chunk estimator is based on n/k sample points. Consequently, as the number of chunks increases, the quality of the chunk estimator decreases. That is, chunk confidence $\rho$ decreases for a fixed error bound t, and error bound t increases for a fixed chunk confidence $\rho$. At the same time, the failure probability $q_k$ decreases for a fixed chunk confidence $\rho$. Thus, the best choice for k depends on the relationship of p and t in Eq. (17) as a function of k and the desired overall confidence $p = 1 - q_k$.

Table 2 summarizes the use of Chebychev bounds for Eq. (17) in conjunction with various values for confidence p, with and without chunking.

TABLE 2

| Aggregate | Desired confidence | Estimate e | Guaranteed bound on t |
|---|---|---|---|
| AVG | $0 \leq p \leq 0.961$<br>e.g., p = 0.95 | $\frac{1}{n}\sum_{i=1}^{n} v_i$ | $\frac{\sigma}{\sqrt{n(1-p)}}$<br>$\frac{4.47\sigma}{\sqrt{n}}$ |
| | $0.961 \leq p \leq 0.984$<br>e.g., p = 0.98 | median of 3 chunk averages | $\frac{\sigma\sqrt{3}}{\sqrt{n(1-p_3)}}$<br>$\frac{5.98\sigma}{\sqrt{n}}$ |
| | $0.984 \leq p$<br>e.g., p = 0.99 | median of $k \geq 5$ chunk averages<br>k = 5 | $\frac{\sigma\sqrt{k}}{\sqrt{n(1-p_k)}}$<br>$\frac{6.87\sigma}{\sqrt{n}}$ |
| SUM | same as AVG, but the estimate and the bound are multiplied by m | | |

For confidence probabilities greater than 96%, Table 2 shows that the best bounds are obtained by using a small number of chunks and applying Chebychev (known $\sigma$) or Chebychev (estimated $\sigma$) to the chunk estimators and reporting the median of the estimators. Table 2 also shows the optimal choice for the number of chunks k and the bound that can be guaranteed for various desired confidences p. The bound is expressed in terms of $\rho_k$, which is the $\rho$ in Eq. (18) such that $p = 1 - q_k$. The bounds are shown for "Chebychev (known $\sigma$)." Alternatively, as in Table 1, bounds for "Chebychev (estimated $\sigma$)" can be obtained by replacing a for $\sigma$ in Table 2, where $\hat{\sigma}$ is computed over all the sample points, not just the samples in one chunk. Bounds for "Chebychev (conservative)" can also be obtained by replacing (MAX−MIN)/2 for $\sigma$.

The advantages of chunking are not obtained when either the Hoeffding bound is used or when the Chebychev (conservative) bound is used. To demonstrate this, use of Hoeffding bound is first considered for Eq. (17) in conjunction with selected values for confidence p with and without chunking.

Let $e_{(k)}$ be a chunk estimator when using $k \geq 1$ chunks. For a fixed n and $t > 0$, a Hoeffding bound provides $$Pr(|e_{(k)} - \mu| \geq t) \leq 2e^{-2nt^2/k(MAX-MIN)^2}. \quad (20)$$

Thus, the probability that estimator $e_{(k)}$ is bad is $2^{1-1/k}$ times the kth root of the probability that estimator $e_{(1)}$, the estimate with no chunking, is bad. As shown below in Lemma 6, no chunking is always better than chunking when analyzed using bounds having dependency on k that is the kth root of the no-chunking bounds. Because the Hoeffding bound had this dependency, no chunking is better than chunking when the Hoeffding bound is used.

Lemma 5: Consider a family of bounds of the form $$Pr(|e_k - \mu| \geq t) \leq c\delta^{1/k}, \quad (21)$$

for some $c \geq 1$ and some $\delta$, $0 < \delta < 1$. Then, for all $k > 1$, the bounds obtained by applying Eq. (21) with no chunking are smaller than the bounds obtained by applying Eq. (21) to the chunk estimators $e_{(k)}$ and then applying Eq. (18) to the median $e_k^*$ of the chunk estimators.

Proof: Let k>1 be the number of chunks. $\rho=1-c^{1/k}$ is inserted into Eq. (18), resulting in $$\Pr(|e_k^* - \mu| \geq t) = \sum_{i=0}^{\lfloor \frac{k}{2} \rfloor} \binom{k}{i}(1-c\delta^{1/k})^i(c\delta^{1/k})^{k-i} \quad (22)$$

$$= c^k\delta + \sum_{i=1}^{\lfloor \frac{k}{2} \rfloor} \binom{k}{i}(1-c\delta^{1/k})^i(c\delta^{1/k})^{k-i} > c\delta, \quad (23)$$

because $c^k \geq c$, each term in the summation is positive when $0<\delta<1$. Thus, the error $\delta$ without chunking is less than the error taking the median of k>1 chunks.

Although it was indicated above that bounds for Chebychev (conservative) can be obtained by substituting (MAX−MIN)/2 for $\sigma$ in Table 2, this bound is strictly worse than the Hoeffding bound for all probabilities at which chunking is useful for Chebychev (conservative). For example, for $0.76 < p \leq 0.99$, the Hoeffding bound with no chunking is smaller than any Chebychev (conservative) bound obtained with or without chunking. Thus, Table 3 summarizes what estimate and bound should be used if the only bound for a is (MAX−MIN)/2.

Then, $$\sum_{i=1}^{k} n_i = n. \quad (24)$$

For the median technique, the $\rho$ in Eq. (17) is determined from Eq. (18) based on a given p and k. For this particular $\rho$, the error bound t in Eq. (17) should be minimized. Thus, the maximum of the chunk error bounds $t_1, \ldots, t_k$ is minimized when all such bounds are equal. In each of the techniques, the bounds are functions of $\rho$, MAX, MIN, $\sigma$, $\hat{\sigma}$ and/or $n_i$. Of these, only $n_i$ may differ from chunk to chunk (e.g., recall that $\hat{\sigma}$ is computed over the entire sample), and $t_i$ is proportional to $$1/\sqrt{n_i}. \quad (25)$$

Thus, all $t_i$ are equal precisely when $n_1=n_2=\ldots=n_k=n/k$.

The techniques of the present invention for the maintenance of join synopsis sets when the underlying base relations are updated (whether an insertion or a deletion) are simple to implement and require only infrequent access to the base relations. To illustrate the maintenance techniques of the present invention for a join synopsis set J(SU) for each relation u, let $p_u$ be the current probability for including a

TABLE 3

| Aggregate | Desired confidence | Estimate e | Guaranteed Bound on t | |
|---|---|---|---|---|
| AVG | $0 < p \leq 0.76$ | $\frac{1}{n}\sum_{i=1}^{n} v_1$ | $\frac{\text{MAX} - \text{MIN}}{2\sqrt{n(1-p)}}$ | by using Chebychev (conservative) |
| | $0.76 \leq p \leq 0.99$ | $\frac{1}{n}\sum_{i=1}^{n} v_1$ | $(\text{MAX} - \text{MIN})\sqrt{\frac{1}{2n}\ln\frac{2}{1-p}}$ | by using Hoeffding |
| SUM | same as AVG, but the estimate and the bound are multiplied by m | | | |

For smaller confidence probabilities, the best bounds are obtained by reporting an overall estimate ignoring the chunks (which is equivalent to taking an average of the chunk estimators), and then applying Hoeffding for guaranteed bounds (see Table 3), applying Chebychev (estimated $\hat{\sigma}$) for large sample bounds, or using the chunk estimators for empirical bounds. In the case of predicates, it is equivalent to the weighted average of the chunk estimators, where each estimator is weighed by the number of tuples in the chunk that satisfy the same.

In one embodiment of the present invention, chunking is used to report empirical error bounds. Each chunk estimator is viewed as an independent experiment on the actual query and data and the user is presented with a report on those experiments. Examples of reports include the minimum and maximum estimator, various quantiles of the estimates, the sample variance of the estimators and/or a scatter plot of the estimators.

Note that only equal-sized chunks have been considered thus far. Lemma 7 below shows that for the techniques considered in this section, using chunks of different sizes only increases the error bounds.

Lemma 6: For each of the error bound determination techniques using chunking and the median of chunks, the error bound t is minimized when all the chunks are the same size.

Proof: Let k be the number of chunks, and let $n_1, \ldots, n_k$ be the chunk sizes.

newly arriving tuple $\tau$ in a relation u in the random sample $S_u$. The probability $p_u$ is typically the ratio of the number of tuples in $S_u$ to the number of tuples in u. Also, let $u \bowtie r_2 \bowtie \ldots \bowtie r_k$ be the maximum foreign key join with source u.

When a new tuple $\tau$ is inserted into a base relation corresponding to a node u in G, the new tuple $\tau$ is first added to $S_u$ with probability $P_u$. When a new tuple $\tau$ is added to $S_u$, the tuple $\{\tau\} \bowtie r_2 \bowtie \ldots \bowtie r_k$ is added to join synopsis set $J(S_u)$. This is computed by performing at most k−1 key look-ups to the base data, one each for relations $r_2, \ldots, r_k$. For any key already in $J(S_u)$, the look-ups for the key or any "descendants" of the relation with that key are not needed because the fields needed to complete the tuple $\{\tau\} \bowtie r_2 \bowtie \ldots \bowtie r_k$ can be extracted from tuples already in $J(S_u)$. When the new tuple $\tau$ is added to $S_u$ with the result that $S_u$ exceeds a target size, then a tuple $\tau'$ is uniformly selected at random for eviction from $S_u$. Finally, the tuple in $J(S_u)$ corresponding to $\tau'$ is removed.

When a tuple $\tau$ is deleted from a base relation corresponding to a node u in G, it must be first determined whether the tuple $\tau$ is in random sample $S_u$. When tuple $\tau$ is in $S_u$, $\tau$ is deleted from $S_u$ and the tuple in $J(S_u)$ corresponding to tuple $\tau$ is removed from $J(S_u)$. In a manner similar to that described by P. B. Gibbons et al., Fast incremental maintenance of approximate histograms, Proc. 23 International Conf. on Very Large Data Bases, pp. 466–475, August 1997, and incorporated by reference herein, when the sample becomes too small because many deletions to the sample have occurred, the sample $S_u$ is repopulated by rescanning relation u and a new tuple is added to join synopsis set $J(S_u)$ using the procedure described above.

Thus, the maintenance algorithm of the present invention only performs look-ups to the base data with a (small) probability $p_u$. Additionally, when a tuple is inserted into a base relation u, join synopsis sets are never updated for any ancestors of u. Such updates would be costly because such operations would be performed for every insert and for each ancestor of u. Instead, the foreign key integrity constraints are relied on for avoiding such costly updates. This leads to Theorem 3.

Theorem 3. The maintenance of join synopsis set in the presence of updates according to the present invention properly maintains each $S_u$ as uniform random samples of u and properly maintains each join synopsis set $J(S_u)$.

Proof. Due to integrity constraints, for each edge from relation w to relation u, there is exactly one tuple in u joining with each tuple in w at all times. Thus, any subsequent tuple inserted into u cannot join with any tuple already in w, and any tuple deleted from u cannot join with a tuple still in w.

In general, similar techniques work for functional dependencies in database schema. For example, see J. D. Ullman, Principles of Database and Knowledge-Based Systems, Volume 1, Computer Science Press, Rockville, Maryland, 1988, which is incorporated by reference herein.

Preferably, updates are applied in a "batch" mode, and join synopsis sets can be effectively kept up-to-date at all times without any concurrency bottleneck. In an online environment in which updates and queries intermix, an approximate answering system cannot afford to maintain up-to-date synopsis sets that require examining every tuple, such as the minimum and maximum value of an attribute, without creating a concurrency bottleneck. In such intermixed-update/query environments, maintenance is performed only periodically, and approximate answers that depend on synopsis sets that require examining every tuple would not take into account the most recent trends in the data (i.e., those occurring since maintenance was last performed). Consequently, accuracy guarantees would be weakened.

The incremental-maintenance algorithm of the present invention can compute a join synopsis set from scratch in limited storage in one scan of the base data followed by indexed look-ups on a small fraction of the keys, should a recomputation be necessary.

The results of test runs performed on data from the TPC-D decision support benchmark show the effectiveness of the present invention for providing highly-accurate answers for approximate join aggregates. Two classes of experiments are presented: accuracy and maintenance. In the accuracy test runs, the accuracy of query answering techniques of the present invention, which are based on join synopsis sets, are compared to that of conventional techniques, which are based on base samples. Two key parameters that are considered are query selectivity and total space allocated to precomputed summaries (summary size). The respective techniques for a fixed selectivity having a varying summary size are first compared. In contrast, the respective techniques for a fixed summary size having varying selectivities are compared. The performance for the respective methods for generating confidence bounds is also presented.

For the maintenance test runs, the cost of keeping join synopsis sets up-to-date in the presence of insertions/ deletions to the underlying data is considered. Join synopsis sets can be maintained with extremely little overhead, even when updates significantly change the characteristics of the underlying data. The test runs were performed on the TPC-D decision support benchmark using a scale factor of 0.3 for generating the test. Table 4 summarizes some important features of the eight (8) relations in the TPC-D database.

TABLE 4

| Table Name | # of Columns | Cardinality |
|---|---|---|
| Customer | 8 | 45 K |
| Lineitem | 16 | 1800 K |
| Nation | 4 | 25 |
| Order | 9 | 450 K |
| Part | 9 | 60 K |
| Partsupplier | 5 | 240 K |
| Region | 3 | 5 |
| Supplier | 7 | 3 K |

The test runs were performed on a lightly-loaded 296 MHZ UltraSPARC-II machine having 256 megabytes of memory and running Solaris 5.6. All data was kept on a local disk with a streaming throughput of about 5 MB/second.

The query used for the accuracy test runs is based on query Q5 of the TPC-D benchmark and is an aggregate that is computed on the join of Lineitem, Customer, Order, Supplier, Nation and Region. Of the six relations involved in the join, the Nation and Region relations were sampled in their entirety because of their low cardinality, thereby making the query as difficult as estimating an aggregate from a (nonetheless complex) four-way join.

FIG. 3 shows the SQL statement for a query $Q_a$ that was used for performing accuracy test runs on the TPC-D benchmark data. Query $Q_a$ is based on query Q5 of the TPC-D benchmark. Query $Q_a$ computes the average price of products delivered by suppliers in a nation to customers who are in the same nation. The select conditions take three input parameters, region, startdate and enddate, for restricting suppliers and customers to be within a specific region and for focussing on business conducted during a specific time interval. In the following results of the test runs, one or more of the region, the startdate and the enddate parameters are varied for showing the performance for various query selectivities.

In the test runs, only the relatively harder problem of computing approximate aggregates on multi-way joins is considered. Of course, the sampling results extend to the relatively simpler case of single table aggregates.

For the following test runs, the characterization of the query mix is assumed realistic in that the query mix characterization is unavailable. In view of this assumption, the six space allocation schemes described above, EquiBase, CubeBase, PropBase, EquiJoin, CubeJoin and PropJoin, were analyzed. For the purposes of the test runs, the four major relations used in query $Q_a$ are concentrated on and base samples and join synopsis sets were allocated based only to those particular relations. Therefore, the base sampling schemes divided the summary space among samples of Lineitem, Customer, Order, and Supplier, whereas the join synopsis sets schemes distributed the summary space to join synopsis sets for Lineitem (which included columns from Customer, Order, and Supplier), for Customer (which includes columns from Order), for Order (whose join synopsis set is just a base sample), and for Supplier (whose join synopsis set is also a base sample).

PropJoin allocates an equal number of tuples to the various samples, whereas EquiJoin divides the space equally. Thus, among the various allocation schemes, the source relation (Lineitem) in the 4-way join in query $Q_a$ was allocated the most space by PropJoin because Lineitem has the largest tuple. Correspondingly, source relation Lineitem was allocated the least space by EquiJoin, while CubeJoin allocated space in between these two extremes.

Among the base sample allocation schemes, PropBase allocates the most space to the base sample of Lineitem, as expected. In decreasing space allocation order for Lineitem, CubeBase followed Propbase, and EquiBase followed Cube-Base. To avoid clutter in FIGS. 4–6 and 8, CubeJoin and CubeBase are not plotted and only numbers for the other four allocation schemes shown. FIGS. 4–6 and 8 cover the entire range of performance for the different allocation schemes.

The results of the test runs also illustrate the sensitivity of the various schemes to the total summary size allocated, as indicated by the parameter SummarySize in the FIGS. 4–6 and 8. SummarySize was varied from 0.1% to 3% of the total database size, thereby varying the actual summary size in bytes from 420 Kbytes to 12.5 Mbytes.

In the first set of test runs, the accuracy of the four space allocation schemes for different values of summary size (parameter SummarySize) and for different query selectivities were considered. The actual answer of running query $Q_a$ (FIG. 3) on the full TPC-D database is compared against the approximate answers obtained from the different allocation schemes.

Figure 4A:
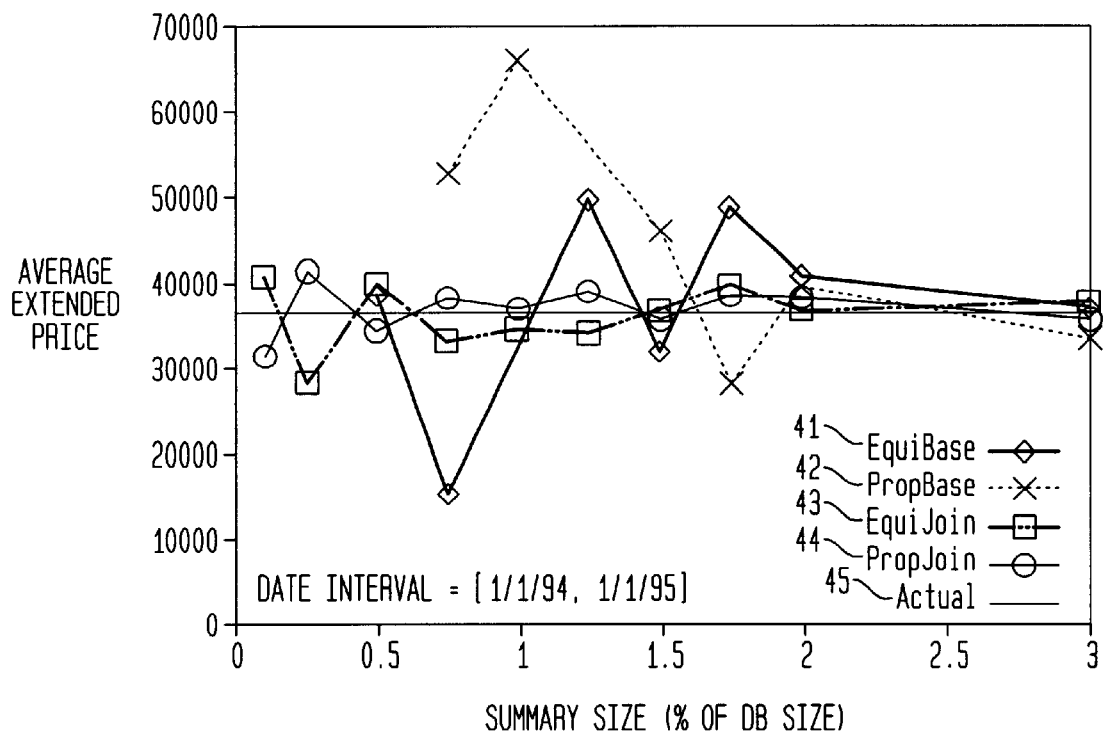
FIGS. 4(a) and 4(b) show the results for different space allocation strategies for different summary size values and for different query selectivities, respectively.
Figure 4B:
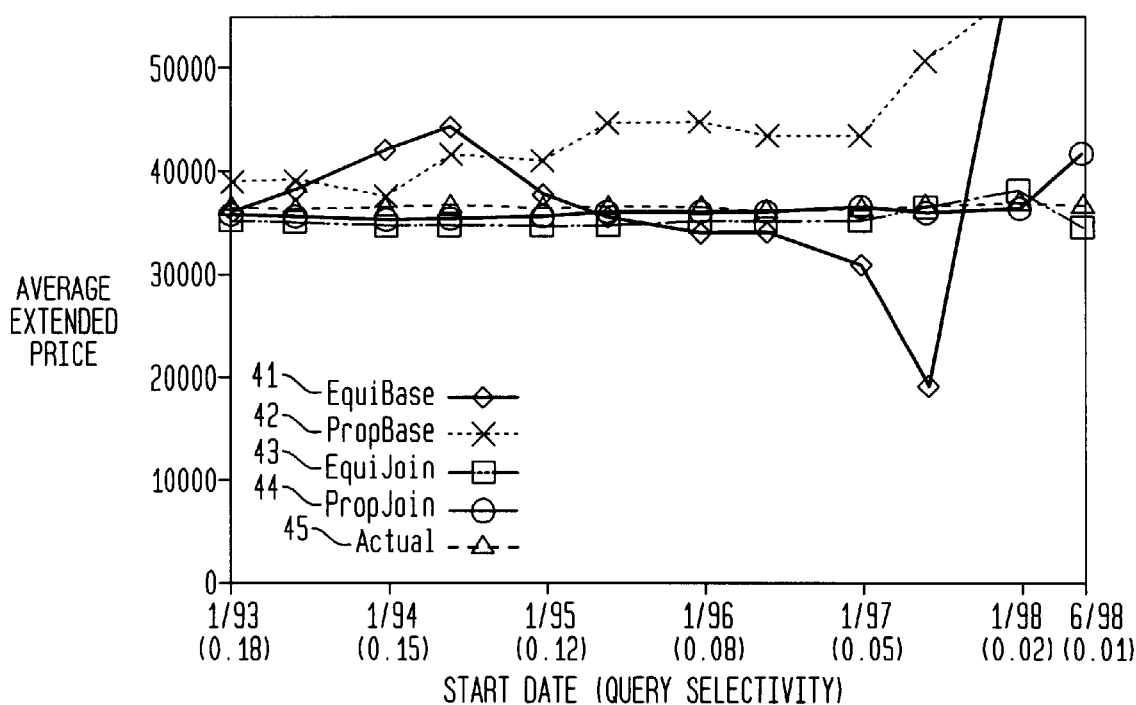

FIGS. 4(a) and 4(b) respectively show the results for different allocation schemes for different summary size values and for different query selectivities. In both FIGS. 4(a) and 4(b), the results of an EquiBase allocation scheme is indicated by 41, the results of a PropBase allocation scheme are indicated by 42, the results of an EquiJoin allocation scheme are indicated by 43, and the results of a PropJoin allocation scheme are indicated by 44. The actual answer is indicated by a straight line 45.

FIG. 4(a) shows a plot of the results of the average extended price computed by the different allocation schemes for varying summary sizes. Based on the specification for query Q5 in the TPC-D benchmark, the region parameter was set to ASIA, and the selection predicate on the o_orderdate column was set to the range Jan. 1, 1994 to Jan. 1, 1995. As shown in FIG. 4(a), the allocation schemes for EquiBase and PropBase produced answers consistently only when the summary size exceeded 1.5% of the database. For smaller sample sizes, the join of the base samples was completely empty. In fact, it is not until a summary size of 2% of the database that the approximate answer produced by the EquiBase and PropBase allocation schemes reasonably approximated the actual answer. More specifically, the EquiBase and the PropBase allocation schemes for smaller summary sizes produced either no output at all (e.g., PropBase for 1.25% synopsis size), or answers that were significantly different from the real answer with errors close to 100% in some cases. This characteristic is shown towards the left side of FIG. 4(a).

In contrast, the corresponding schemes based on join synopsis sets, EquiJoin and PropJoin, not only produced an output over the entire range of summary sizes studied, but produced an output that is fairly accurate in estimating the correct answer. A more detailed analysis of the error bounds for the approximate answers generated by EquiJoin and PropJoin is presented below. The results from both the EquiJoin and the PropJoin allocation schemes are within 14% of the actual answer, even for a summary size of 0.1% (420 Kbytes) shared among all of the four join synopsis sets. Additionally, the variation in the answers provided by EquiJoin and by PropJoin was smaller than the variation in the answers provided by the corresponding base sampling schemes. The differences in the output size between the allocation schemes based on base samples and based on join synopsis sets is shown Table 5, which shows the number of tuples in the join output for the EquiBase, PropBase, EquiJoin and PropJoin allocation schemes.

TABLE 5

| Summary Size | Base Samples | | Join Synopsis Sets | |
|---|---|---|---|---|
| | EquiBase | PropBase | EquiJoin | PropJoin |
| 0.1% | 0 | 0 | 6 | 25 |
| 1% | 0 | 2 | 56 | 142 |
| 1.5% | 12 | 4 | 104 | 228 |
| 2% | 38 | 44 | 131 | 300 |
| 3% | 38 | 108 | 195 | 453 |

In most cases, the allocations schemes based on sets of join synopses produce a number of tuples that is at least an order of magnitude more than the number of tuples produced by a corresponding base sampling scheme. As expected, PropJoin is the most accurate because PropJoin assigns the most space to Lineitem, the root of the 4-way join.

FIG. 4(b) shows the sensitivity of the four allocation schemes for varying selectivities, with a database summary size set to 1.5%. The selectivity of the query $Q_a$ is changed by changing the date range in the selection condition of the o_orderdate attribute. To control selectivity, the enddate parameter was set to Jan. 1, 1999, the tail-end of the date range in the TPC-D specification. The startdate parameter was varied from Jan. 1, 1993 to Jan. 6, 1999 in six months steps. The startdates are shown on the x-axis of FIG. 4(b) with the corresponding query selectivity indicated in brackets below each startdate.

As shown by FIGS. 4(a) and 4(b), summary size and selectivity had a similar effect on the performance of the base sampling schemes. While the answers returned by the EquiBase and PropBase allocation schemes were reasonably close to the actual answer when the selectivity is high (toward the left side of the x-axis), the answers fluctuated dramatically as the selectivity decreases. As expected, the results of the join synopsis schemes, EquiJoin and PropJoin, stayed close to the actual answer over the entire range deviating only slightly when the selectivity was down to 1%.

Thus, FIGS. 4(a) and 4(b) show the advantages of allocation schemes based on join synopsis sets over base sampling schemes for approximate join aggregates. Join synopsis sets are able to provide fairly accurate aggregate answers, even with a summary size of only 0.1% of the database.

Figure 5:
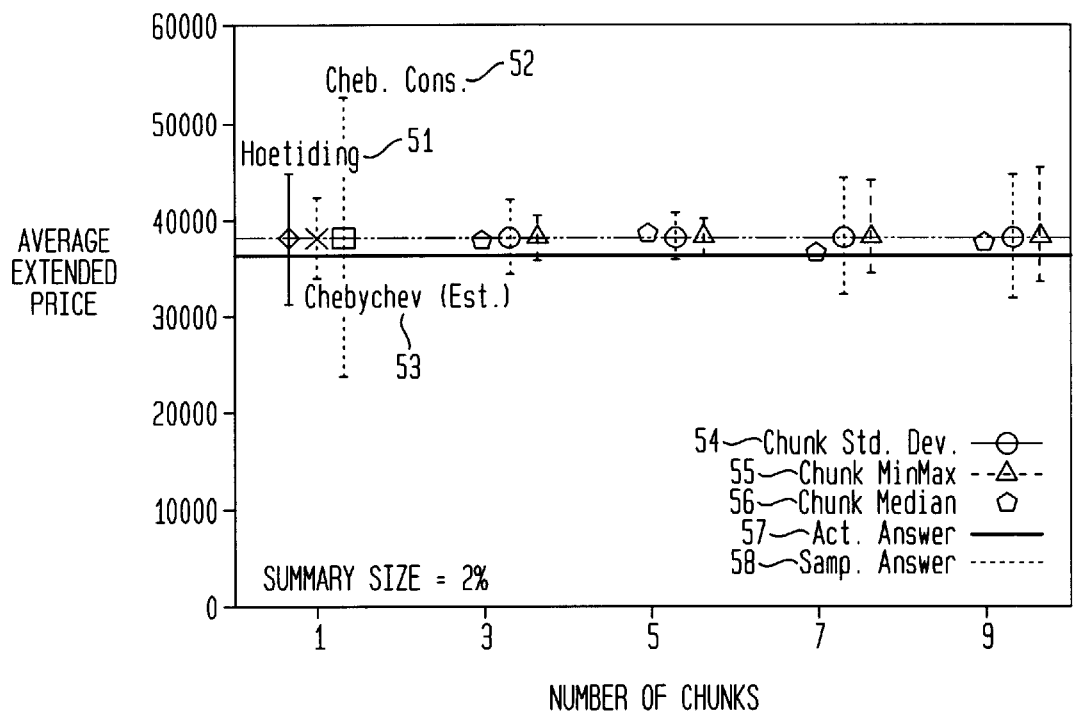
FIG. 5 is a graph showing the error bounds for the PropJoin space allocation strategy for a summary size of 2% for different error bounds.

Based on the results of the test runs using PropJoin, the PropJoin allocation scheme was used for the test runs relating to confidence bounds. Results for other allocation schemes based on join synopsis sets were qualitatively similar. FIG. 5 shows a graph of the error bounds for the PropJoin allocation scheme for a summary size of 2%. FIG. 5 shows the 90% confidence bounds for three of the five techniques listed in Table 1, specifically, the Hoeffding bound, the Chebychev (estimated σ) bound, and the Chebychev (conservative) bound. The Chebychev (known σ) bound was not applicable because σ, the standard deviation of the extended price over all tuples in the database that satisfy the predicate was not known a priori and would be prohibitively extensive to compute at query time.

The Hoeffding, Chebychev (estimated σ), and Chebychev (conservative) bounds are compared with bounds that are based on chunk statistics. The number of chunks are varied along the x-axis. Because the first three bounds are independent of the number of chunks, the first three bounds are shown only once toward the left side of FIG. 5 for x=1. (Note that some of the bounds are shown slightly shifted on their x-coordinate to avoid confusion.)

Among the guaranteed bounds, FIG. 5 shows that the Hoeffding bounds (shown at 51) are tighter than Chebychev (conservative) bounds (shown at 52) for a confidence of 90%, in accordance with Table 3. Next, the Chebychev (estimated σ) bounds (shown at 53) are tighter by 40% on each side in comparison to the Hoeffding bounds. While these particular bounds are not guaranteed because they are based on large sample assumptions, in all test runs, the bounds were not found to not overlap the exact answer.

The chunk-related error bound Chunk Std. Dev., shown at 54 in FIG. 5, used the standard deviation of the chunk answers for determining the bound. While not a guaranteed bound, Chunk Std. Dev. bounds are tighter than Hoeffding and Chebychev (estimated σ), and always overlapped the exact answer in the test runs. As the number of chunks increase, the variance increases and, as expected, the bounds become worse. As previously mentioned, the chunk size is inversely proportional to the number of chunks because the total amount of space allocated to a join synopsis set is fixed.

The Chunk Min-Max bound (shown at 55) plots a bar from the minimum to the maximum value returned by the chunk results. The bar expands with increasing chunks, but always includes the exact answer in the test runs. Lastly, the Chunk Median (shown at 56), which, as indicated in Table 2, leads to tighter guaranteed bounds when the desired confidence is above 96%. Because a lower confidence bound (90%) was used in this case, the error bar is not plotted for the median. The actual answer is shown at 57 and the answer based on samples (specifically, the average over all tuples in the join synopsis set that satisfy the predicate) is shown at 58.

One of the motivations for studying empirical bounds, such as obtained by chunking, even though the techniques of the present invention can produce estimated answers that are very close to the exact answer, is that error bounds using known statistical techniques, such as Hoeffding bound, are comparatively poor. For example, the estimated answer deviates from the exact answer by 4.5%, as shown in FIG. 5. The Hoeffding error bound, however, provides a 90% confidence range of ±20%. The test runs confirm the utility of using empirical bounds for supplementing the guaranteed statistical bounds. The guaranteed bounds are based on worst case assumptions on the data distribution for a given MAX and MIN. Hence, the gap between the guaranteed bounds and the empirical bounds can be made arbitrarily large by adding a few outliers that increase MAX and MIN, while not affecting the exact answer. Also, the use of a small number of chunks (e.g., 5 chunks) for generating chunk-based bounds can further enhance the confidence in the estimate produced by an approximate answering system.

Figure 6:
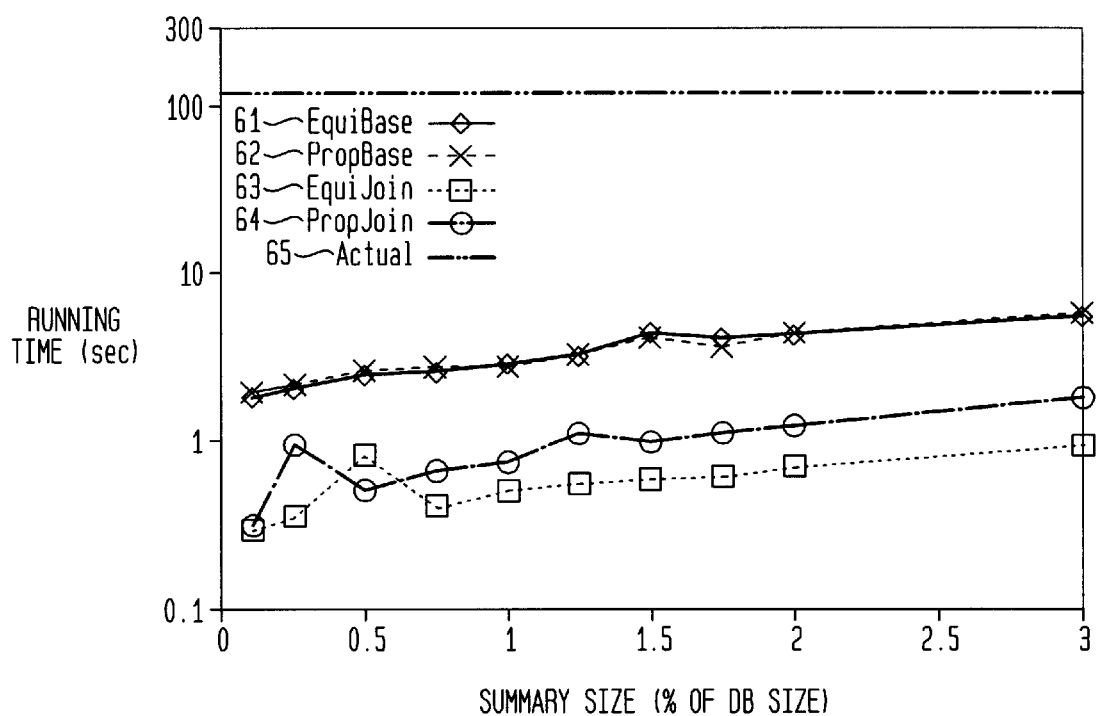
FIG. 6 shows the time taken by various space allocation schemes for executing the query $Q_a$.

FIG. 6 shows the amount of time taken by the various allocation schemes for executing the query $Q_a$. The ordinate axis is shown in a logscale. The time to execute the actual query was 122 seconds and is shown as a straight line 65 near the top of FIG. 6. The response times for the EquiBase and the PropBase allocation schemes are respectively indicated at 61 and 62. The response times for the EquiJoin and the PropJoin allocation schemes are respectively shown at 63 and 64. As expected, all response times increased with increasing summary size. For all the summary sizes considered, however, the execution time for the test query using join synopsis sets was two orders of magnitude less than for the execution time for the query based on base samples. The execution times using base samples were more than an order of magnitude less than the execution time for computing the exact answer.

This set of test runs demonstrates that it is possible to use join synopsis sets for obtaining extremely fast approximate answers with minimal loss in accuracy. Applications, such as decision support and data warehousing, which can often tolerate marginal loss in result accuracy, can benefit tremendously from the faster responses of approximate query answering systems.

Figure 8A:
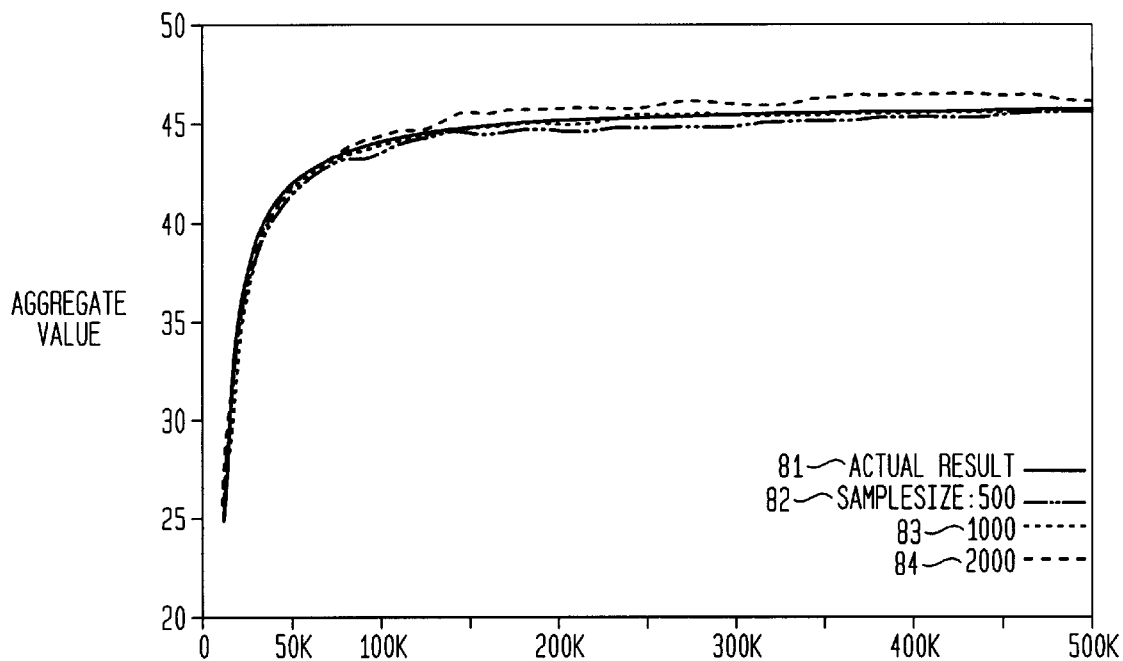
FIG. 8(a) shows the aggregate values computed from join synopsis sets of different sample sizes.
Figure 8B:
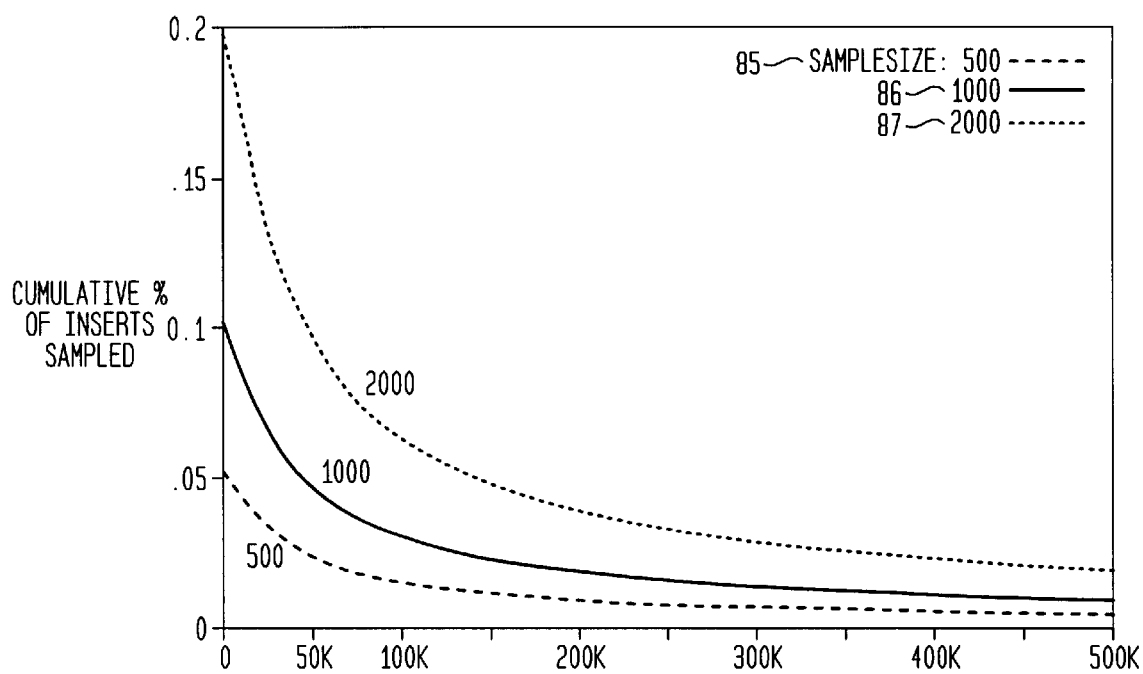
FIG. 8(b) shows the average fraction of the inserted Lineitem tuples that are actually inserted into a join synopsis set.

The maintenance of a join synopsis set was considered for Lineitem as tuples are inserted into the Lineitem table, using an incremental maintenance algorithm. Insertions into other tables in the schema can be safely ignored in maintaining the Lineitem join synopsis. The results of test runs showing that join synopsis sets can be maintained with extremely minimal overhead are shown in FIGS. 8(a) and 8(b). Join synopsis sets provide excellent approximate answers, even when updates significantly change the nature of the underlying data. These test runs were based on a join between the Lineitem and Order tables. The query used for these test runs retrieved the average quantity of tuples from the Lineitem table having a particular value for the o_orderstatus column. The SQL statement for the query is given in FIG. 7.

FIG. 8(a) shows the aggregate values computed from join synopsis sets of different sample sizes. In FIG. 8(a), the abscissa shows the number of inserts, while the ordinate shows the aggregate values computed from join synopsis of various sizes. The aggregate value for the exact result is shown at 81. The aggregate values for a sample size of 500, 1000 and 2000 tuples are respectively shown at 82, 83 and 84. Even for extremely small sample sizes, the join synopsis approach of the present invention was able to track the actual aggregate value quite closely despite significant changes in the data distribution.

FIG. 8(b) shows that maintenance of join synopsis sets is extremely inexpensive by plotting the average fraction of the inserted Lineitem tuples that were actually inserted into the join synopsis set. In FIG. 8(b), the abscissa shows the number of inserts, and the ordinate shows the cumulative percentage of inserts sampled. In FIG. 8(b), the cumulative percentage of inserts sampled for sample sizes of 500, 1000 and 2000 tuples are respectively shown at 85, 86 and 87.

In accordance with the incremental maintenance algorithm of the present invention, the base data is accessed only when a tuple is inserted into the join synopsis set. FIG. 8(b) shows that the number of accesses of the base data was a small fraction of the total number of tuples inserted. (For example, when maintaining a sample of 1000 tuples and processing 500,000 inserts, the base data was accessed only 4822 times.)

The present invention was developed as part of the Approximate QUery Answering (Aqua) project at Bell Labs, as disclosed by P. B. Gibbons et al., Aqua project white paper, Technical Report, Bell Laboratories, Murray Hill, N.J., December 1997, and by P. B. Gibbons et al., System and techniques for approximate query answering, Technical report, Bell Laboratories, Murray Hill, N.J., February 1998, both of which are incorporated by reference herein. The Aqua system is a module that sits on top of any commercial DBMS that manages a data warehouse and precomputes statistical summaries on the relations in the warehouse. Currently, the statistics take the form of samples and histograms that are stored as regular relations inside the warehouse; and are incrementally maintained up-to-date as the base data is updated.

Figure 9:
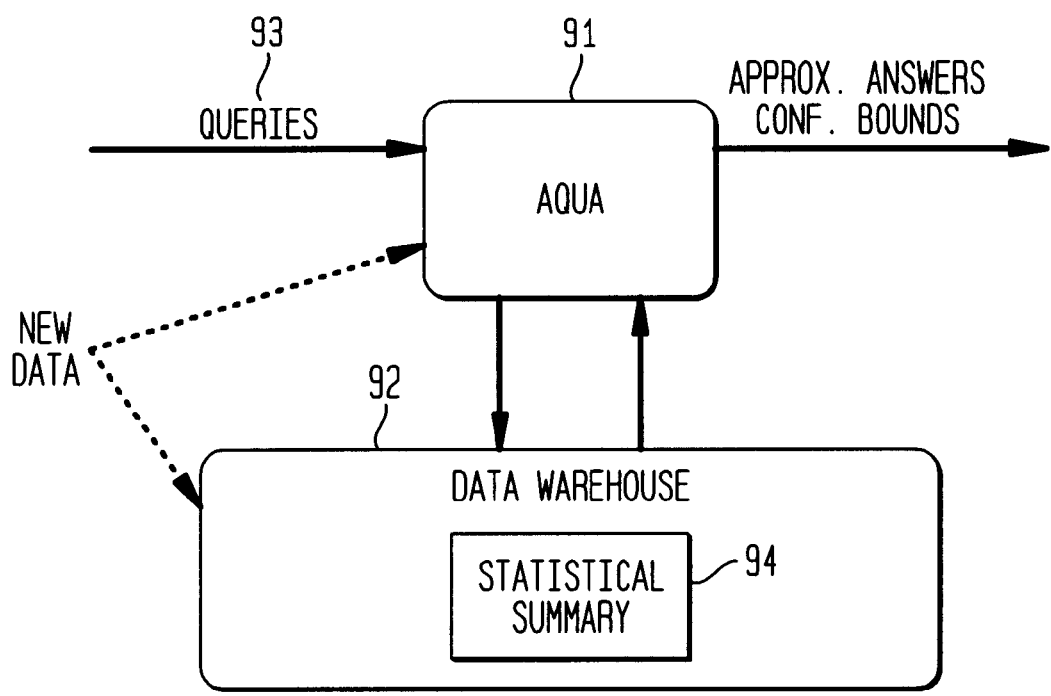
FIG. 9 shows a high-level architecture of the Aqua system project in which the present invention can be used.

A high-level architecture of the Aqua system 91 in relation to a data warehouse 92 is depicted in FIG. 9. A user query 93 is received by the Aqua system, which responds to the user query using the precomputed statistical summaries 94 stored in warehouse 92. An approximate answer is provided by rewriting the user query over the summary relations and executing the new query. Rewriting a user query involves suitably scaling the results of certain operators within the query. Finally, the query and the approximate answer are analyzed for providing guarantees regarding the quality of the answer in accordance with error bounds described above.

FIGS. 10(a)–10(c) show a query rewritten according to the present invention to use join synopsis sets. An original query is shown in FIG. 10(a), which is a variation of the query shown in FIG. 7. The query of FIG. 10(a) differs from the query of FIG. 7 by computing the SUM instead of the AVG aggregate. When the query is submitted to the present invention, the join being computed in the query is identified and the query is rewritten to refer to an LOsynopsis table. LOsynopsis is a 1% sample of the join between the Lineitem and Order tables. The rewritten query that is submitted to the data warehouse 92 is shown in FIG. 10(b). Calculation of error bounds is not shown here for simplicity. The error bound calculation is an additional expression in the select clause of the rewritten query that computes one of the error bounds discussed previously.

Chunks are used for providing empirical guarantees on the approximate answers that are computed by the present invention. Because the number of chunks is fixed before query time, one approach to implementing chunks is to manifest the chunks as separate tables and run the transformed query on each chunk. Such an approach, however, can be expensive. Instead, to avoid this overhead, a group-by operation is made use of, as follows:

An extra column is added to each join synopsis set relation and populated randomly with a value in the range [1 ... k], where k is the desired number of chunks. The extra column is added at the time the join synopsis set is created and not at query time. At query time, the query is rewritten to include the extra column as a (possibly additional) group-by column, and the rewritten query is executed. In a post-processing step, the estimate (e.g., the median or the average) and the bound are assembled, and the result is returned. In this way, all chunks are handled with a single query.

FIG. 10(c) shows the query in FIG. 10(a) transformed to use chunks. In FIG. 10(c), chunkid is a column that is added to the LOsynopsis table for identifying chunks. Once again, computation of error bounds is not shown in FIG. 10(c) for simplicity.

Figure 11:
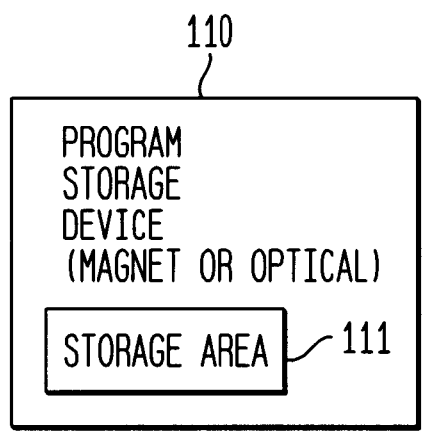
FIG. 11 shows a program storage device having a storage area for storing a machine readable program of instructions that are executable by the machine for performing the method of the present invention for generating approximate answers in a large data warehousing environment in response to complex aggregate queries.

FIG. 11 shows a program storage device 110 having a storage area 111. Information stored in the storage area in a well-known manner that is readable by a machine, and that tangibly embodies a program of instructions executable by the machine for performing the method of the present invention described herein for generating approximate answers in a large data warehouse environment in response to complex aggregate queries. Program storage device 110 can be a magnetically recordable medium device, such as a magnetic diskette or hard drive, or an optically recordable medium device, such as an optical disk.

While the present invention has been described in connection with the illustrated embodiments, it will be appreciated and understood that modifications may be made without departing from the true spirit and scope of the invention.

What is claimed is:

1. A method for generating a statistical summary of a database, the database having a plurality of base relations, the method comprising steps of:

forming a sample-tuple set for at least one selected base relation of the plurality of base relations of the database, each sample-tuple set containing at least one sample tuple from a corresponding base relation; and forming a join synopsis set for each selected base relation, each join synopsis set containing a join synopsis for each sample tuple in a sample-tuple set, a join synopsis of a sample tuple being based on a join of the sample tuple and at least one descendent relation of the sample tuple, all join synopsis sets forming a statistical summary of the database.

2. The method according to claim 1, wherein the join synopsis of the sample tuple is based on a foreign key join of the sample tuple and at least one descendent relation of the sample tuple.

3. The method according to claim 1, wherein the join synopsis of the sample tuple is based on a join of the sample tuple and all descendent relations of the sample tuple.

4. The method according to claim 1, further comprising a step of storing all join synopses sets.

5. The method according to claim 4, further comprising a step of allocating storage space among each respective synopsis set based on assumed characteristics of a query workload.

6. The method according to claim 5, wherein the step of allocating storage space among the respective join synopsis sets includes a step of dividing an allotted storage space equally between join synopsis sets.

7. The method according to claim 5, wherein the step of allocating storage space among the respective join synopsis sets includes a step of dividing an allocated storage space between the join synopsis sets in proportion to a cube root of a join synopsis tuple size of each respective join synopsis set.

8. The method according to claim 5, wherein the step of allocating storage space among the respective join synopsis sets includes a step of dividing an allocated storage space between the join synopsis sets in proportion to a join synopsis tuple size of each respective join synopsis set.

9. The method according to claim 4, further comprising steps of eliminating redundant columns of each join synopsis; and storing only selected columns of each join synopsis.

10. The method according to claim 1, further comprising steps of renormalizing tuples of each join synopsis into constituent relations of the join synopses; and removing duplicative tuples.

11. The method according to claim 1, wherein the steps of claim 1 are performed when the database is initialized.

12. The method according to claim 1, wherein a number of tuples allocated to each join synopsis is the same.

13. The method according to claim 1, further comprising steps of determining a fraction of queries in a query set for which each relation of the plurality of base relations of the database is one of a source relation in a join and a sole relation in a query without joins; and dividing an allocated storage space among join synopsis sets for minimizing an average relative error over the queries based on a high-level characterization of the query set.

14. The method according to claim 1, further comprising a step of generating an approximate answer to a query based on the join synopses.

15. The method according to claim 14, wherein the query is an aggregate query.

16. The method according to claim 14, further comprising steps of:
receiving a user query for an approximate answer; and
reformulating the user query to be the query based on the join synopses.

17. The method according to claim 14, further comprising a step of generating a confidence bound for the approximate answer.

18. The method according to claim 17, wherein the confidence bound is based on one of a Hoeffding bound, a Chebychev (conservative) bound, a Chebychev (estimated a) bound and a Central Limit Theorem bound.

19. The method according to claim 17, wherein the step of generating a confidence bound includes steps of:
partitioning the join synopses into a predetermined number of subsets; and
generating an estimator for each subset.

20. The method according to claim 19, wherein the predetermined number of subsets is based on a desired confidence level.

21. The method according to claim 19, further comprising steps of:
determining an average of the estimators for the subsets; and
generating the confidence bound based on the average of the estimators.

22. The method according to claim 19, further comprising steps of:
determining a median of the estimators for the subsets; and
generating the confidence bound based on the median of the estimators.

23. The method according to claim 19, wherein the subsets are each a same size.

24. The method according to claim 19, further comprising a step of reporting a result based on the estimator for each subset.

25. The method according to claim 24, wherein the result is a summary of the estimator for each subset.

26. The method according to claim 1, further comprising steps of:
adding a new tuple to the sample-tuple set for a selected base relation with a probability p when the new tuple is inserted into the selected base relation, probability p being related to a ratio of a number of tuples in the sample-tuple set to a number of tuples in the selected base relation; and
forming a join synopsis corresponding to the new tuple when the new tuple is added to the sample-tuple set for the selected base relation, the join synopsis for the new tuple being based on a join of the new tuple and at least one descendent relation of the new tuple.

27. The method according to claim 26, further comprising steps of:
uniformly selecting at random a tuple of the sample-tuple set for the selected base relation when a target size for the sample-tuple set is exceeded; and
removing the selected tuple from the sample-tuple set.

28. The method according to claim 1, further comprising steps of:

removing a selected tuple from the sample-tuple set for a selected base relation when the selected tuple is removed from the selected base relation and is contained in the sample-tuple set for the selected base relation; and
removing the join synopsis corresponding to the removed tuple.

29. A program storage device, comprising:
a storage area; and
information stored in the storage area, the information being readable by a machine, and tangibly embodying a program of instructions executable by the machine for performing method steps for generating a statistical summary of a database, the database having a plurality of base relations, the method comprising steps of:
forming a sample-tuple set for at least one selected base relation of the plurality of base relations of the database, each sample-tuple set containing at least one sample tuple from a corresponding base relation; and
forming a join synopsis set for each selected base relation, each join synopsis set containing a join synopsis for each sample tuple in a sample-tuple set, a join synopsis of a sample tuple being based on a join of the sample tuple and at least one descendent relation of the sample tuple, all join synopsis sets forming a statistical summary of the database.

30. The program storage device according to claim 29, wherein the join synopsis of the sample tuple is based on a foreign key join of the sample tuple and at least one descendent relation of the sample tuple.

31. The program storage device according to claim 29, wherein the join synopsis of the sample tuple is based on a join of the sample tuple and all descendent relations of the sample tuple.

32. The program storage device according to claim 29, further comprising a step of storing all join synopses sets.

33. The program storage device according to claim 32, further comprising a step of allocating storage space among each respective synopsis set based on assumed characteristics of a query workload.

34. The program storage device according to claim 29, further comprising steps of:
eliminating redundant columns of each join synopsis; and
storing only selected columns of each join synopsis.

35. The program storage device according to claim 29, further comprising steps of:
renormalizing tuples of each join synopsis into constituent relations of the join synopses; and
removing duplicative tuples.

36. The program storage device according to claim 29, wherein the steps of claim 33 are performed when the database is initialized.

37. The program storage device according to claim 29, further comprising steps of:
determining a fraction of queries in a query set for which each relation of the plurality of base relations of the database is one of a source relation in a join and a sole relation in a query without joins; and
dividing an allotted storage space among join synopsis sets for minimizing an average relative error over the queries based on a high-level characterization of the query set.

38. The program storage device according to claim 29, further comprising a step of generating an approximate answer to a query based on the join synopses.

39. The program storage device according to claim 38, wherein the query is an aggregate query.

40. The program storage device according to claim 38, further comprising steps of:

receiving a user query for an approximate answer; and reformulating the user query to be the query based on the join synopses.

41. The program storage device according to claim 38, further comprising a step of generating a confidence bound for the approximate answer.

42. The program storage device according to claim 41, wherein the step of generating a confidence bound includes steps of:

partitioning the join synopses into a predetermined number of subsets; and generating an estimator for each subset.

43. The program storage device according to claim 42, further comprising a step of reporting a result based on the estimator for each subset.

44. The program storage device according to claim 29, further comprising steps of:

adding a new tuple to the sample-tuple set for a selected base relation with a probability p when the new tuple is inserted into the selected base relation, probability p being related to a ratio of a number of tuples in the sample-tuple set to a number of tuples in the selected base relation; and forming a join synopsis corresponding to the new tuple when the new tuple is added to the sample-tuple set for the selected base relation, the join synopsis for the new tuple being based on a join of the new tuple and at least one descendent relation of the new tuple.

45. The program storage device according to claim 44, further comprising steps of:

uniformly selecting at random a tuple of the sample-tuple set for the selected base relation when a target size for the sample-tuple set is exceeded; and removing the selected tuple from the sample-tuple set.

46. The program storage device according to claim 29, further comprising steps of:

removing a selected tuple from the sample-tuple set for a selected base relation when the selected tuple is removed from the selected base relation and is contained in the sample-tuple set for the selected base relation; and removing the join synopsis corresponding to the removed tuple.

* * * * *

UNITED STATES PATENT AND TRADEMARK OFFICE
CERTIFICATE OF CORRECTION

PATENT NO.    : 6,477,534 B1
DATED         : November 5, 2002
INVENTOR(S)   : Acharya et al.

It is certified that error appears in the above-identified patent and that said Letters Patent is hereby corrected as shown below:

<u>Column 29,</u>
Line 17, "a)" should be, -- σ) --

Signed and Sealed this

Twenty-fourth Day of June, 2003

JAMES E. ROGAN
*Director of the United States Patent and Trademark Office*